(12) United States Patent
Hughes et al.

(10) Patent No.: US 11,898,049 B2
(45) Date of Patent: Feb. 13, 2024

(54) HIGH SOLIDS COATINGS FOR BUILDING PANELS

(71) Applicant: ARMSTRONG WORLD INDUSTRIES, INC., Lancaster, PA (US)

(72) Inventors: John E. Hughes, Lincoln University, PA (US); Steven L Masia, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 50 days.

(21) Appl. No.: 17/529,540

(22) Filed: Nov. 18, 2021

(65) Prior Publication Data
US 2022/0073778 A1 Mar. 10, 2022

Related U.S. Application Data

(62) Division of application No. 16/114,369, filed on Aug. 28, 2018, now Pat. No. 11,267,984.

(51) Int. Cl.
C09D 131/04 (2006.01)
C08K 3/22 (2006.01)
(Continued)

(52) U.S. Cl.
CPC .............. *C09D 131/04* (2013.01); *C08K 3/22* (2013.01); *C08K 3/26* (2013.01); *C09D 7/06* (2013.01); *C09D 7/43* (2018.01); *C09D 7/45* (2018.01); *C09D 7/63* (2018.01); *E04C 2/043* (2013.01); *C08K 3/34* (2013.01); *C08K 5/10* (2013.01);
(Continued)

(58) Field of Classification Search
None
See application file for complete search history.

(56) References Cited

U.S. PATENT DOCUMENTS 2,247,633 A * 7/1941 Hearn ................ C09D 5/18
106/157.6
2,555,049 A * 5/1951 Lyne ................. C08F 8/00
524/533
(Continued)

FOREIGN PATENT DOCUMENTS

EP 0614955 A1 5/1998
EP 0614955 B1 * 5/1998 .......... C09D 125/14
(Continued)

OTHER PUBLICATIONS

Beevers—Tg of MMA-styrene copolymers—Trans.Faraday Soc.—RSC—1961 (Year: 1961).*
(Continued)

*Primary Examiner* — John Vincent Lawler
(74) *Attorney, Agent, or Firm* — Patrick Sheldrake

(57) ABSTRACT

Described herein is a coating composition suitable for application to a building panel. The coating composition comprises inorganic pigment, liquid carrier, and a humectant comprising a first ester-containing compound. The liquid carrier may be present in an amount ranging from about 10 wt. % to about 30 wt. % based on the total weight of the coating composition. Described herein are also building panels coated with the coating composition and methods of their production.

20 Claims, 14 Drawing Sheets

Related U.S. Application Data

(60) Provisional application No. 62/694,550, filed on Jul. 6, 2018, provisional application No. 62/551,514, filed on Aug. 29, 2017.

(51) Int. Cl.

| | |
|---|---|
| *C08K 3/26* | (2006.01) |
| *C09D 7/63* | (2018.01) |
| *E04C 2/04* | (2006.01) |
| *C09D 7/61* | (2018.01) |
| *C09D 7/43* | (2018.01) |
| *C09D 7/45* | (2018.01) |
| *C08K 5/10* | (2006.01) |
| *C08K 3/34* | (2006.01) |
| *E04C 2/00* | (2006.01) |
| *C09D 7/06* | (2006.01) |

(52) U.S. Cl.
CPC ............ *C08K 2003/2227* (2013.01); *C08K 2003/2241* (2013.01); *C08K 2003/265* (2013.01); *C08L 2205/03* (2013.01); *E04C 2002/005* (2013.01)

(56) References Cited

U.S. PATENT DOCUMENTS

| | | | | |
|---|---|---|---|---|
| 3,067,053 A | * | 12/1962 | Tarantion | C09B 67/006 |
| | | | | 524/45 |
| 3,494,878 A | * | 2/1970 | Haag | C09D 123/08 |
| | | | | 427/397 |
| 3,714,107 A | | 1/1973 | Smith | |
| 3,984,269 A | * | 10/1976 | Schneller | E04B 2/7457 |
| | | | | 427/403 |
| 4,080,479 A | * | 3/1978 | Vamvacas | C04B 41/63 |
| | | | | 427/387 |
| 4,571,356 A | * | 2/1986 | White, Sr. | E04D 5/10 |
| | | | | 428/524 |
| 4,575,525 A | * | 3/1986 | Wacome | C09J 151/02 |
| | | | | 524/48 |
| 4,755,563 A | * | 7/1988 | West | C08F 293/005 |
| | | | | 525/287 |
| 4,906,726 A | | 3/1990 | Cummings | |
| 5,526,628 A | | 6/1996 | Knudson | |
| 5,919,558 A | | 7/1999 | Chao | |
| 6,020,065 A | * | 2/2000 | Girgis | D02G 3/40 |
| | | | | 428/394 |
| 6,117,434 A | | 9/2000 | Oyama | |
| 6,379,458 B1 | * | 4/2002 | Immordino | C04B 20/1022 |
| | | | | 106/785 |
| 6,476,097 B1 | * | 11/2002 | Zhao | C08F 265/06 |
| | | | | 523/205 |
| 9,309,376 B2 | | 4/2016 | Palmer | |
| 9,644,108 B2 | | 5/2017 | Palmer | |
| 9,702,142 B1 | | 7/2017 | Wang | |
| 2006/0172916 A1 | * | 8/2006 | Hidalgo | C04B 24/2641 |
| | | | | 510/475 |
| 2009/0298968 A1 | | 12/2009 | Bury | |
| 2010/0040832 A1 | * | 2/2010 | Herbert | C03C 25/1095 |
| | | | | 428/343 |
| 2010/0104884 A1 | | 4/2010 | Bloom | |
| 2010/0196701 A1 | * | 8/2010 | Botty | B41M 5/52 |
| | | | | 428/323 |
| 2010/0300025 A1 | | 12/2010 | Houck | |
| 2015/0330072 A1 | * | 11/2015 | Kragness | B32B 37/24 |
| | | | | 428/323 |
| 2016/0159028 A1 | * | 6/2016 | Oleske | B32B 15/04 |
| | | | | 428/116 |
| 2016/0168414 A1 | * | 6/2016 | Li | C09D 133/08 |
| | | | | 523/205 |
| 2016/0221836 A1 | | 8/2016 | Zhao | |
| 2017/0210931 A1 | * | 7/2017 | Bohling | C09D 143/02 |

FOREIGN PATENT DOCUMENTS

| | | | | |
|---|---|---|---|---|
| EP | 1403330 A1 | | 3/2004 | |
| JP | 4815164 B2 | | 11/2011 | |
| KR | 10-2007-0097155 | | 10/2007 | |
| KR | 2007/0097155 | * | 10/2007 | C09B 67/04 |
| WO | WO 2013138209 A1 | | 9/2013 | |
| WO | WO 2016/015239 A1 | | 2/2016 | |
| WO | WO 2018/102331 A1 | | 6/2018 | |

OTHER PUBLICATIONS

Chung—KR 10-2007-0097155 A—ISR D#2—MT—soluble dispersion-process pigment—2007 (Year: 2007).*
Polymer Database—Poly(vinyl acetate)—Tg—Sep. 29, 2020 (Year: 2020).*
SoapGoods—Polysorbate 80—2021 (Year: 2021).*
Brazilian Search Report for co-pending application BR1120200041947 dated May 31, 2022.
Beevers—Tg of MMA-styrene copolymers—Trans.Faraday Soc., RSC, 1961.
Polymer Database—Poly(vinyl acetate)—Tg, Sep. 29, 2020.

* cited by examiner

HIGH SOLIDS COATINGS FOR BUILDING PANELS

CROSS-REFERENCE TO RELATED APPLICATIONS

This application is a divisional of U.S. patent application Ser. No. 16/114,369, filed on Aug. 28, 2018, which claims the benefit of U.S. Provisional Patent Application No. 62/551,514, filed on Aug. 29, 2017, as well as U.S. Provisional Patent Application No. 62/694,550, filed Jul. 6, 2018. The disclosure of the above applications are incorporated herein by reference in their entireties.

BACKGROUND

Ceiling systems are installed into room environments to help control noise as well as enhance the aesthetic appeal of those room environments. These ceiling systems may comprise one or more building panels having specific aesthetic properties that help contribute to the appeal of the room environment. Previous attempts at improving the aesthetic properties of these building panels included applying decorative coatings to the surface of the building panel. However, such decorative coatings tend to have associated difficulties in unpredictability in pot-life and manufacturing time required for proper application and drying of the decorative coatings. Thus, a need exists for building panels comprising a decorative coating applied thereto that does not create the same difficulties with respect to manufacturing and while also not sacrificing the required aesthetic properties provided by the decorative coating.

BRIEF SUMMARY

According to some embodiments, the present invention is directed to a coated building panel comprising a body comprising a first major surface and a side surface that intersects the first major surface; a coating applied to at least one of the first major surface or the side surface, the coating comprising inorganic pigment, and a humectant comprising a first ester-containing compound; wherein the surface coating comprises a liquid carrier in an amount less than about 1 wt. % based on the total weight of the coating.

In other embodiments, the present invention includes a coating composition comprising inorganic pigment; liquid carrier; and a humectant comprising a first ester-containing compound; and wherein the liquid carrier is present in an amount ranging from about 10 wt. % to about 30 wt. % based on the total weight of the coating composition.

Other embodiments of the present invention include a method of forming a building panel having a face coating, the method comprising: a) applying a coating composition to a surface of a body, the coating composition comprising an inorganic pigment and a humectant comprising a first ester-containing compound; and b) drying the coating composition to form the face coating on the body; wherein the coating composition has a solid's content ranging from about 10 wt. % to about 30 wt. % based on the total weight of the coating composition.

Other embodiments of the present invention include a building material comprising inorganic fiber; inorganic pigment; polymeric binder; and a humectant comprising a first ester-containing compound.

In other embodiments, the present invention includes a coated building panel comprising: a body comprising a first major surface and a side surface that intersects the first major surface; a coating applied to at least one of the first major surface or the side surface, the coating comprising: a binder having a pH of at least about 7.0 and a Tg of at least 20° C.; a pigment; and a viscosity modifier; wherein the pigment and binder are present in a weight ratio of at least about 5:1.

Other embodiments of the present invention include a coating composition comprising a liquid carrier a solid blend comprising: a binder having a pH of at least about 7.0 and a Tg of at least 20° C.; a pigment; and a viscosity modifier; wherein the pigment and binder are present in a weight ratio of at least about 5:1, and wherein the liquid carrier is present in an amount ranging from about 10 wt. % to about 30 wt. % based on the total weight of the coating composition.

Other embodiments of the present invention include a coated building panel comprising: a body comprising a first major surface and a side surface that intersects the first major surface; a coating applied to at least one of the first major surface or the side surface, the coating comprising: a binder; a pigment; and a viscosity modifier comprising a humectant and a dispersant present in a weight ratio ranging from about 1:1 to about 4:1; wherein the pigment and binder are present in a weight ratio of at least about 5:1.

Other embodiments of the present invention include a coating composition comprising a liquid carrier; a solid blend comprising: a binder; a pigment; and a viscosity modifier comprising a humectant and a dispersant present in a weight ratio ranging from about 1:1 to about 4:1; wherein the pigment and binder are present in a weight ratio of at least about 5:1, and wherein the liquid carrier is present in an amount ranging from about 10 wt. % to about 30 wt. % based on the total weight of the coating composition.

In other embodiments, the present invention includes a method of creating an acoustical coating comprising a) spray-coating a composition to a building surface, the coating composition comprising a liquid carrier and a solid blend comprising pigment and binder, whereby the pigment and binder are present in a weight ratio of at least 5:1.

Other embodiments of the present invention include a building system comprising: a first building panel positioned adjacent to a second building panel, and a seam formed between the first and second building panels; a seam-filling material applied to the seam; a coating applied to the first and second building panels and the seam-filing material, the coating comprising: a binder having a pH of at least about 7.0 and a Tg of at least 20° C.; a pigment; and a viscosity modifier; wherein the pigment and binder are present in a weight ratio of at least about 5:1.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
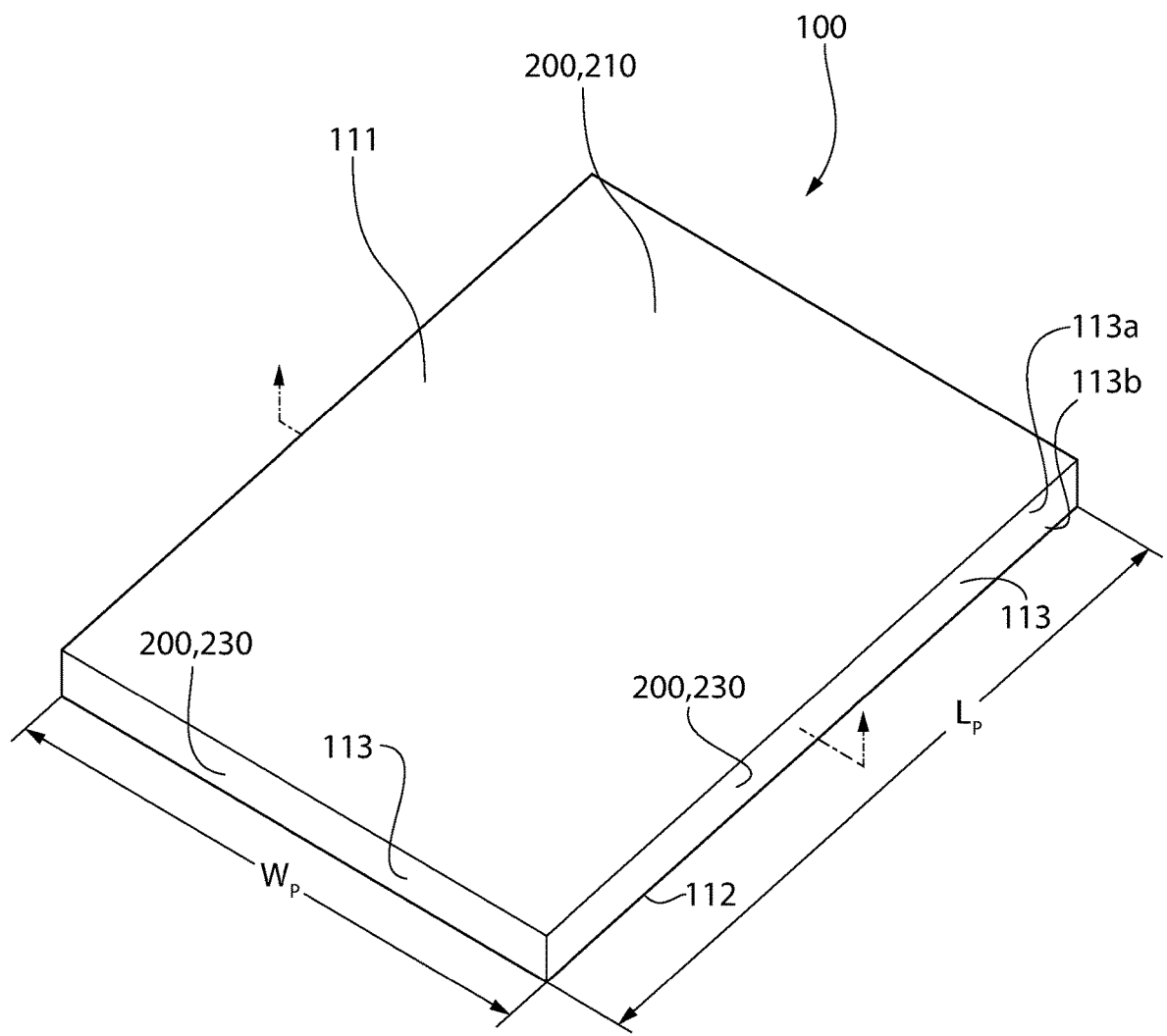
FIG. 1 is top perspective view of a coated building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 4:
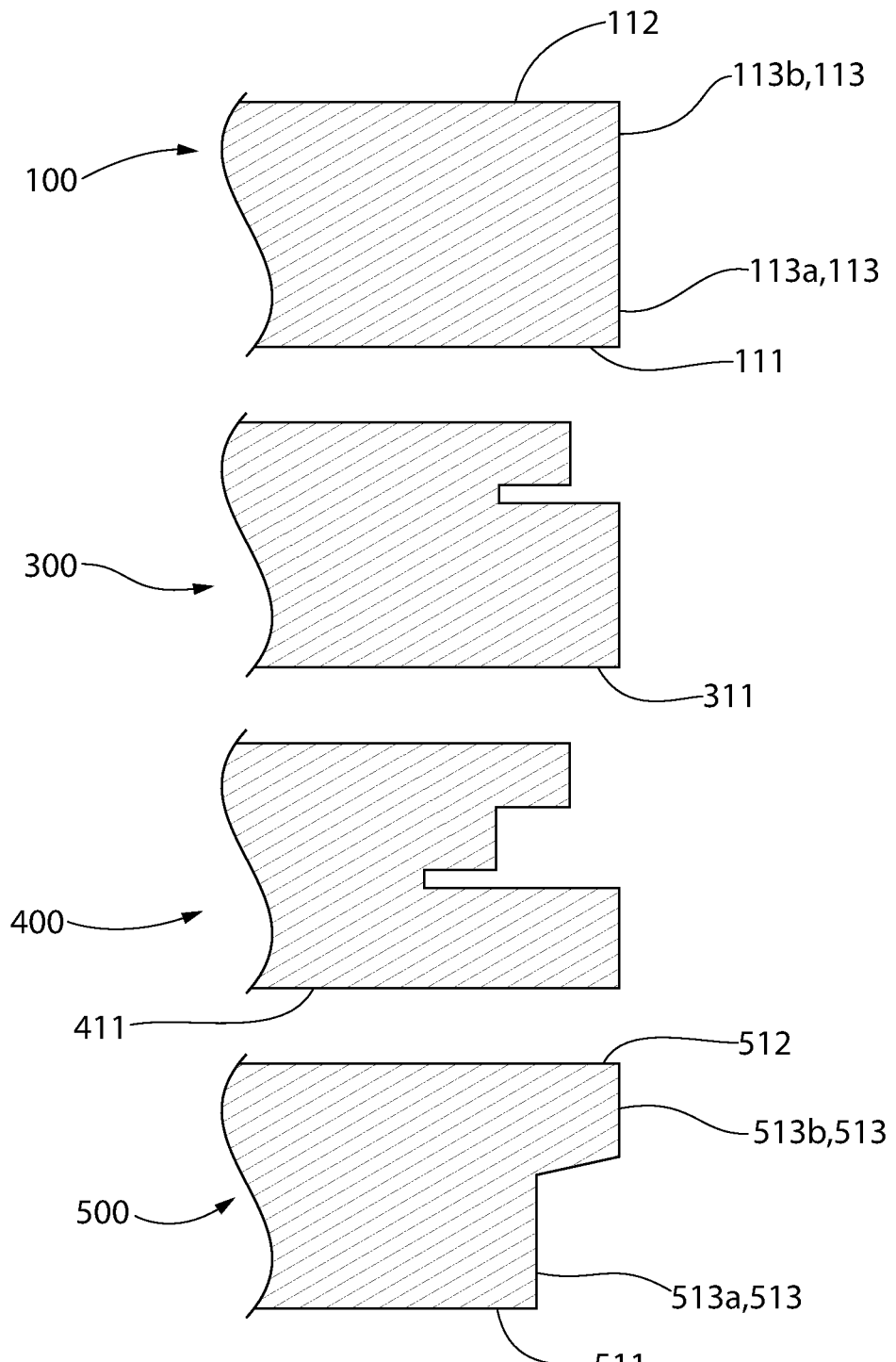
FIG. 4 is a cross-sectional close-up view of the edges of the building panels according to the present invention.

Referring to FIGS. 1 and 4, the present invention includes a coated building panel 100 (referred to herein as "building panel") comprising a first major surface 111 opposite a second major surface 112 and a side surface 113 that extends between the first major surface 111 and the second major surface 112, thereby defining a perimeter of the ceiling panel 100. The side surface 113 may comprise an upper portion 113a and a lower portion 113b, wherein the upper portion 113a is adjacent to the first major surface 111 and the lower portion 113b is adjacent to the second major surface 112.

Figure 3:
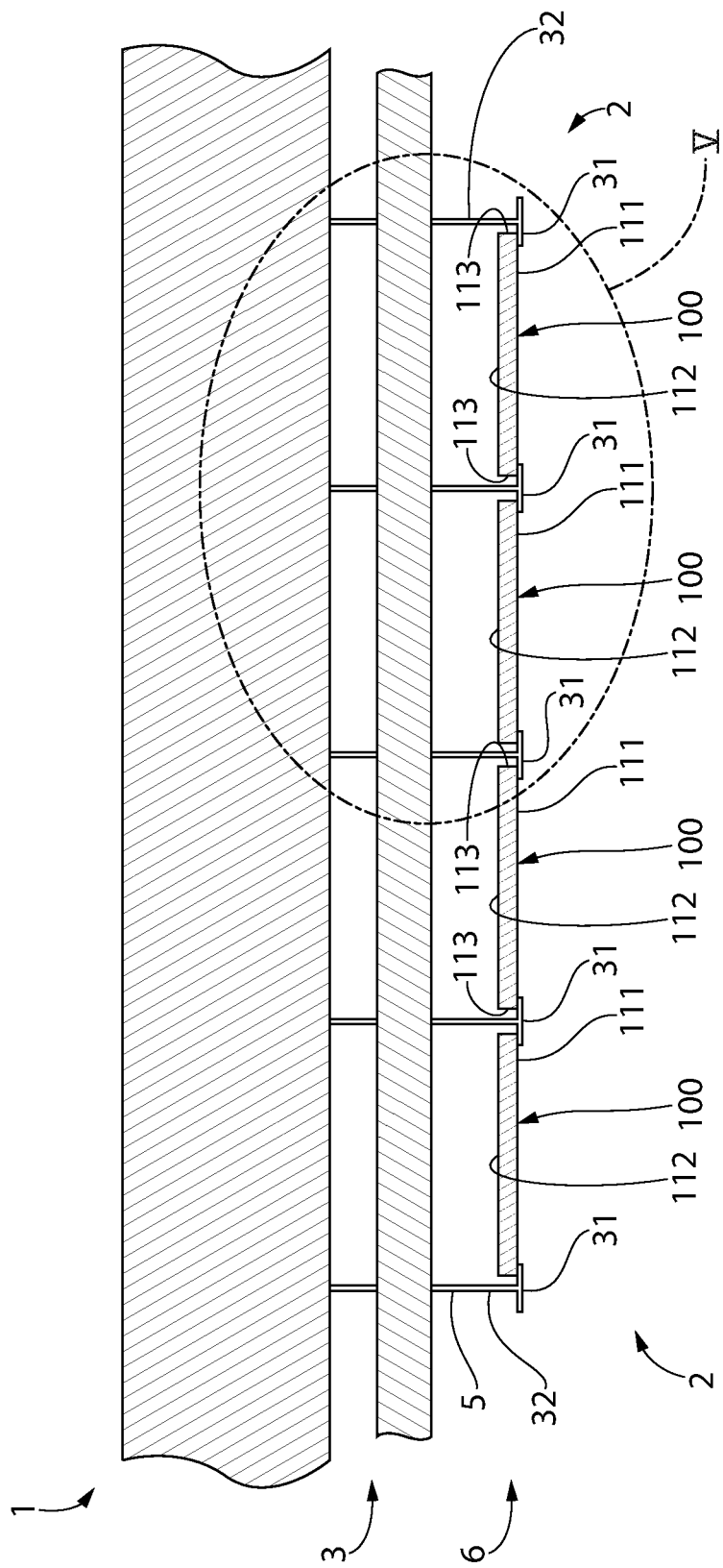
FIG. 3 is a ceiling system comprising the coated building panel of the present invention.

Referring to FIG. 3, the present invention may further include a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed according to at least two variations. In a first variation, the building panel 100 is positioned entirely above the horizontal flange 31 of the support struts 5. In the first variation, at least a portion of the first major surface may be concealed from the active room environment 2 by the horizontal flange 31 because the horizontal flange 31 contacts the first major surface 111, thereby supporting it in the ceiling system 1. In the first variation, the entire side surface 113—including the upper portion 113a and the lower portion 113b—may be concealed from the active room environment 2 by the horizontal flange 311. The second variation will be described further herein.

Figure 2:
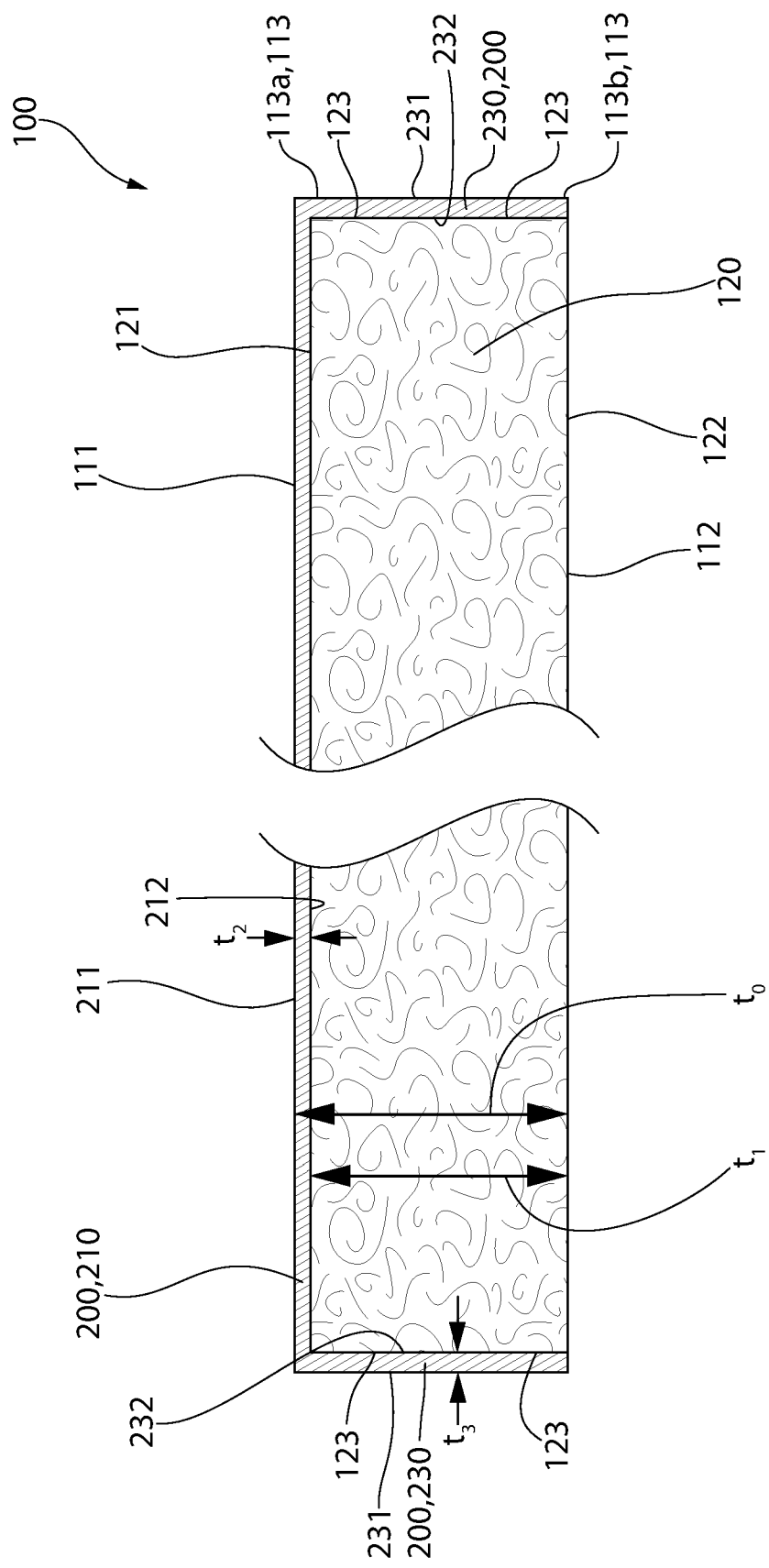
FIG. 2 is a cross-sectional view of the coated building panel according to the present invention, the cross-sectional view being along the II line set forth in FIG. 1.

Referring now to FIGS. 1 and 2, the building panel 100 of the present invention may have a panel thickness to as measured from the first major surface 111 to the second major surface 112. The panel thickness to may range from about 12 mm to about 40 mm—including all values and sub-ranges there-between. The building panel 100 may have a length $L_P$ ranging from about 30 cm to about 310 cm—including all values and sub-ranges there-between. The building panel 100 may have a width WP ranging from about 10 cm to about 125 cm—including all values and sub-ranges there-between.

The building panel 100 may comprise a body 120 and a surface coating 200 applied thereto—as discussed further herein. The body 120 comprises an upper surface 121 opposite a lower surface 122 and a body side surface 123 that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between.

The body 120 may be porous, thereby allowing airflow through the body 120 between the upper surface 121 and the lower surface 122—as discussed further herein. The body 120 may be comprised of a binder and fibers. In some embodiments, the body 120 may further comprise a filler and/or additive.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof. In some embodiments, the body 120 may be a gypsum board—i.e., commonly referred to as "dry wall."

Referring now to FIG. 2, the building panel 100 may further comprise the surface coating 200 applied to at least one of the first major surface 121 and/or the side surface 123 of the body 120. The surface coating 200 may comprise a pigment that imparts a desired aesthetic appearance, such as color. According to the present invention the term "color coating" and "surface coating" may be used interchangeably. The term "color coating" 200 refers to a surface coating 200 comprising a color pigment and the resulting surface coating 200 exhibits a color on the visible color spectrum—i.e., violet, blue, green, yellow, orange, or red. The color coating 200 may also have a color of white, black, or grey. The color coating 200 may further comprise combinations of two or more colors—such a primary color (i.e., red, yellow, blue) as well as an achromatic color (i.e., white, grey).

A non-limiting example of a color coating 200 may be pink and produced from a combination of red and white pigments. Another non-limiting example of a color coating 200 may be green and produced from a combination of blue and yellow pigments. Another non-limiting example of a color coating 200 may be brown and produced from a combination of red, yellow, and black pigments.

In some embodiments, the surface coating 200 may include a face coating 210 that is applied to the first major surface 121 of the body 120. In other embodiments, the surface coating 200 may include an edge coating 230 that is applied to the side surface 123 of the body 120. In other embodiments, the building panel 100 may comprise both the face coating 210 applied to the first major surface 121 of the body 120 as well as the edge coating 230 applied to the side surface 123 of the body 120.

Referring now to FIG. 2, the edge coating 230 may comprise an outer surface 231 opposite an inner surface 232. The edge coating 230 has an edge coating thickness $t_3$ was measured from the outer surface 231 to the inner surface 232 of the edge coating 210. The edge coating thickness $t_3$ may range from about 100 μm to about 600 μm including all thicknesses and sub-ranges there-between. In a preferred embodiment, the edge coating thickness $t_3$ may range from about 200 μm to about 500 μm including all thicknesses and sub-ranges there-between. The edge coating 230 (i.e., in the dry-state) may be present in an amount ranging from about 7.5 g/m² to about 150 g/m²—including all amounts and sub-ranges there-between.

According to the present invention, the phrase "dry-state" indicates a composition that is substantially free of a liquid carrier (e.g., liquid water). Thus, the edge coating 230 in the dry-state may comprise the pigment, the humectant, and the binder, and have less than about 0.1 wt. % of liquid carrier based on the total weight of the edge coating 230. In a preferred embodiment, the edge coating 230 in the dry-state has a solid's content of about 100 wt. % based on the total weight of the edge coating 230. Conversely, a composition that is in a "wet-state," which refers to a composition containing various amounts of liquid carrier—as discussed further herein.

The edge coating 230 may comprise a pigment and a viscosity modifier. The edge coating 230 may further comprise a binder. In some embodiments, the viscosity modifier may include one or more of a humectant, a dispersant, and/or a wetting agent. In some embodiments the viscosity modifier comprises a humectant. In other embodiments, the viscosity modifier comprises a blend of humectant and dispersant.

The edge coating 230 may be formed by applying an edge coating composition in the wet-state having a solids content ranging from about 70 wt. % to about 90 wt. %—including all amounts and sub-ranges there-between. The edge coating composition in the wet-state may comprise the pigment, the humectant, and the binder, as well as a liquid carrier. The liquid carrier may be selected from water, VOC solvent—such as acetone, toluene, methyl acetate—or combinations thereof. In a preferred embodiment, the liquid carrier is water and comprises less than 1 wt. % of VOC solvent based on the total weight of the liquid carrier. The edge coating composition in the wet-state may further comprise the dispersant and/or wetting agent.

The solid's content is calculated as the fraction of materials present in the edge coating composition (or face coating composition, as discussed herein) that is not the liquid carrier. Specifically, the solid's content of the edge coating composition may be calculated as the amount of humectant, pigment, and binder in the edge coating composition and dividing it by the total weight of the edge coating composition (including liquid carrier).

Therefore, the amount of each component in the edge coating composition may be calculated by multiplying the desired amount of each of the humectant, pigment, and binder (as well as other additives, such as dispersant and/or wetting agent) present in the edge coating 230 in the dry-state by the total solids content of the edge coating composition. For example, for an edge coating 230 in the dry-state comprising about 60 wt, % r, of pigment, whereby that edge coating 230 is formed from an edge coating composition having a solids content of 70 wt. %—the amount of the pigment in the edge coating composition would be 42 wt. % based on the total weight of the edge coating composition in the wet-state—i.e., 60 wt. %×0.7=42 wt. % of pigment in the edge coating composition.

The edge coating composition in the wet-state has a high-solid's content. According to the present invention, the term "high solids content" refers to a solids content of at least about 70 wt. % based on the total weight of the edge coating composition. Stated otherwise, the liquid carrier is present in a maximum amount of about 30 wt. % based on the total weight of the edge coating composition Previously, using such pigments to create edge coatings (and other face coatings) required that the wet-state coating composition comprise a relatively large amount of carrier—thereby resulting in low solids contents for these coating compositions. Requiring a large amount of carrier stems from previous coating compositions having poor carrier retention characteristics. Such poor carrier retention creates a substantial risk of the carrier being prematurely driven off the coating composition during processing—for example, the carrier being evaporated off before the coating composition can be properly applied to one or more surfaces 121, 123 of the body. Being at risk of premature carrier loss not only creates the risk of unwanted increases in viscosity of the coating composition over time, but it also makes these increases in viscosity unpredictable as a single coating composition may be subjected to various processing conditions depending on the type of coating application desired, whereby each processing condition may have a unique impact on the amount of carrier that is retained. Therefore, poor carrier retention makes it harder and/or impossible to properly apply a single coating composition to the body because that coating composition may be unworkable and/or have such a short pot-life that there was insufficient time to apply the coating composition in a large-scale production of building panels.

The previous solution to such carrier retention issues was to overload the wet-state coating composition with liquid carrier. Excessive amounts of liquid carrier were added the coating composition to accommodate for the amount of carrier that would be prematurely lost during processing. As a result, when carrier is prematurely lost and the viscosity of the coating composition increases, the overall coating composition may still remain under a viscosity threshold that is sufficiently low to allow for processing. However, adding such excessive amounts of carrier fails to address all issues associated with poor carrier retention because these coating compositions still prematurely lose carrier over time resulting in unpredictable viscosity changes as the coating composition is processed. Simply keeping the overall viscosity below a certain threshold does not eliminate the unpredictable fluctuations in viscosity that are detrimental to processing and application of the coating composition. Therefore, a need exists for a coating composition that can exhibit a stabilized viscosity overtime.

Additionally, coating compositions having such unpredictable carrier retention characteristics also create a chance that the coating composition may not prematurely lose carrier during processing—as carrier lose is entirely unpredictable. Therefore, when addressing the viscosity increase by overloading the coating compositions with carrier, other setbacks are created as the coating compositions may still retain large amounts of carrier at the time of application to the one or more surfaces 121, 123 of the body. Having such large relative amounts of carrier—thereby resulting in low solids contents—at the time of application is undesirable because it may result in poor aesthetic appearance in the resulting edge coating and/or excessively long and/or resource intensive (e.g., heating temperature) drying periods that are required to properly drive off the excessive amounts of carrier from the coating composition to form the dry-state surface coating 200. Thus, there exists a need to stabilize and reduce the evaporation of the coating compositions while still having these coating compositions be at a relatively high solids content.

With this understanding, it has been surprisingly discovered that adding a humectant to the coating composition of the present invention provides the needed viscosity stabilization by helping increase carrier retention while not interfering with the other coating composition characteristics needed to properly apply the composition as a face coating in the production of the building panel. Humectants were previously known as being suitable in improving the freeze-thaw characteristics of water-based compositions—i.e., preventing unwanted freezing of such compositions at low temperatures. However, it has now been surprisingly discovered that the addition of humectants to water-based coating compositions allows for viscosity stabilization and increased carrier retention—even when the wet-state coating composition is being held at a high solids content. The unexpected benefit is that the coating compositions of the present invention may be applied under a variety of application conditions without the risk of short pot-life or long curing times. Another unexpected advantage is that the addition of the humectant reduces and/or eliminates building up of the coating composition on the face of the coating applicator. Furthermore, while other additives, such as dispersants and wetting agents, may be added to the coating composition of the present invention, the addition of the humectant allow for the elimination of VOC solvents such that the carrier may be entirely water-based.

The humectant may be present in the edge coating 230 in an amount ranging from about 0.4 wt. % to about 3.0 wt. %—including all amounts and sub-ranges there-between—based on the total dry weight of the edge coating 230. The humectant may be present in the edge coating composition in the wet-state in an amount ranging from about 0.25 wt. % to about 2.5 wt. %—including all amounts and sub-ranges there-between—based on the total wet-weight of the edge coating composition. The humectant may be non-ionic. The humectant may be hydrophobic, as discussed in greater detail herein.

The humectant of the present invention may be an ester-containing compound. The term "ester-containing compound" refers to a compound having at least one ester bond, as shown herein:

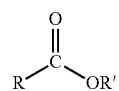

Whereby R may include C1-C24 straight or branched aliphatic chain, one or more additional ester groups, one or more ketone groups, or combinations thereof. Group R' may include a C1-C24 straight or branched aliphatic chain, a compound derived from a carbohydrate, and a combination thereof. The carbohydrate may be a monosaccharide or a disaccharide. Non-limiting examples of monosaccharide include glucose, fructose, and galactose. Non-limiting examples of disaccharide include sucrose, lactulose, maltose, and trehalose. In a preferred embodiment, the carbohydrate is a disaccharide, specifically sucrose, having the structure:

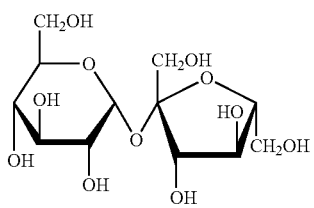

Whereby ester group is formed on the hydroxmethyl group present on the glucose portion of the sucrose compound—as discussed in greater detail herein.

According to the present invention, the humectant may be a blend of a (I) first ester-containing compound and a (II) second ester-containing compound. The (I) first ester-containing compound may have the Formula I:

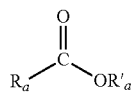

Formula I

Wherein $R_a$ comprises at least one ketone group that is optionally separated from the ester groups by a C1-C24 straight or branched aliphatic chain. $R'_a$ may comprise a C1-C24 straight or branched aliphatic chain that is free of ketone groups. In a preferred embodiment for the (I) first ester-containing, $R_a$ comprises a single ketone group and $R'_a$ is a C1-C4 straight aliphatic chain. In an even more preferred embodiment, the (I) first ester-containing compounds has the formula:

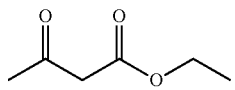

Whereby the compound may be formed from the ester-forming reaction of ethanol and pyruvic acid. Pyruvic acid is a keto acid. Other non-limiting examples of keto acid suitable in the formation of the (I) first ester-containing compound include acetoacetic acid, levulinic acid, and the like. Ethanol is a mono-functional alcohol. Other non-limiting examples of mono-functional alcohol include methanol, ethanol, n-propanol, isopropanol, sec-butanol, isobutanol, n-butanol, methyl amyl alcohol, methyl butanol, cyclohexanol and any mixtures thereof.

The (II) second ester-containing compound may have the Formula II:

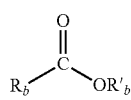

Formula II

Wherein $R_b$ comprises a C1-C24 straight or branched aliphatic chain, and $R'_b$ comprises a compound derived from a carbohydrate. The carbohydrate may be one of the monosaccharide or disaccharide compounds previously discussed. In a preferred embodiment for the (II) second ester-containing compound, $R_b$ is a C16-C24 straight aliphatic chain and $R'_b$ is derived from a disaccharide compound. In an even more preferred embodiment, the (II) second ester-containing compound, $R_b$ is a C16-C24 straight aliphatic chain and $R'_b$ is a glucose containing disaccharide, whereby the ester bond is directly bonded to the glucose portion of the disaccharide. A non-limiting example of the (II) second ester-containing compounds has the formula:

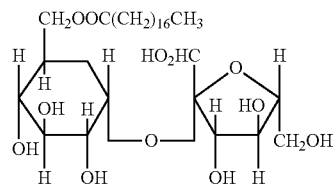

Whereby the compound may be formed from the ester-forming reaction of sucrose and arachidic acid. Arachidic acid is a saturated fatty acid. Other non-limiting examples of saturated fatty acids suitable in the formation of the (II) second ester-containing compound include caprylic acid, capric acid, lauric acid, myristic acid, palmitic acid, stearic acid, behenic acid, lignoceric acid, cerotic acid, and the like.

The (I) first ester-containing compound and the (II) second ester-containing compound may be present together in a single blend, whereby the (I) first ester-containing compound and the (II) second ester-containing compound are present in relative amounts. The amount of the (I) first ester-containing compound and the (II) second ester-containing compound in the single blend may be the same or different.

As discussed, the humectant may be hydrophobic. As a result, the presence of the humectant in the edge coating 230 may result in the building panel 100 having enhanced hydrophobicity. According to the present invention, the term "hydrophobicity" or "hydrophobic" means a composition that is extremely difficult to wet and is capable of repelling liquid water under atmospheric conditions. Thus, as used herein, the term "hydrophobic" refers to a surface that generates a contact angle of greater than 90° with a reference liquid (i.e. water).

The notion of using the contact angle made by a droplet of liquid on a surface of a solid substrate as a quantitative measure of the wetting ability of the particular solid has also long been well understood. Wetting is the ability of a liquid to maintain contact with a solid surface, resulting from intermolecular interactions when the two are brought together. The degree of wetting (wettability) is determined by a force balance between adhesive and cohesive forces. If the contact angle is greater than 90° for the water droplet to the substrate surface then it is usually considered to be hydrophobic.

The side surface 113 of the building panel 100 according to the present invention may exhibits a water contact angle of at least about 90°. At this contact angle, most common waters and oils (e.g., fingerprint oils) will not wet the side surface 113 of the building panel 100—thereby making the building panel 100 resistant to smudging during installation. In some embodiments, the side surface 113 of the building panel 100 according to the present invention may exhibits a water contact angle of at least about 107°.

The edge coating 230 may comprise pigment. The pigment present in the edge coating 230 may be an inorganic pigment. The pigment may be a particle exhibiting one of the previously discussed colors with respect to the color coating 200. Thus, the edge coating 230 may also be referred to herein as a "color coating" 230. Non-limiting examples of inorganic pigment include particles of carbon black, graphite, graphene, copper oxide, iron oxide, zinc oxide, calcium carbonate, manganese oxide, titanium dioxide and combinations thereof. The inorganic pigments may include individual particles having colors selected from, but not limited to, red, blue, yellow, black, green, brown, violet, white, grey and combinations thereof. The particles that make up the first pigment may have a particle size ranging from about 15 nm to about 1000 μm—including all sizes and sub-ranges there-between.

The pigment may be present in an amount ranging from about 1 wt. % to about 80 wt. % based on the total dry-weight of the edge coating 230—including all wt. % and sub-ranges there-between. Similar to the phrase "dry-state"—the phrase "dry-weight" refers to the weight of a component or composition without including any additional weight of liquid carrier. Thus, when calculating the dry weight of a component or composition, the calculation should be based solely on the weight of the solid components (e.g., dispersant, pigment, binder, etc.), and should exclude any amount of residual liquid carrier that may still be present from the wet-state.

In a preferred embodiment, the pigment may be present in an amount ranging from about 20 wt. % to about 70 wt. % based on the total dry-weight of the edge coating 230—including all wt. % and sub-ranges there-between. In a preferred embodiment, the pigment may be present in an amount ranging from about 40 wt. % to about 65 wt. % based on the total dry-weight of the edge coating 230—including all wt. % and sub-ranges there-between.

The edge coating 230 may further comprise binder. The binder may be present in the edge coating 230 in an amount ranging from about 1 wt. % to about 50 wt. % based on the total dry-weight of the edge coating 230—including all amounts and sub-ranges there-between. The binder may be polymeric. In a preferred embodiment, the binder may be present in the edge coating 230 in an amount ranging from about 10 wt. % to about 35 wt. % based on the total dry-weight of the edge coating 230—including all amounts and sub-ranges there-between. The binder may be polymeric. The binder may have a glass transition temperature ("Tg") that ranges from about 15° C. to about 30° C. —including all temperatures and sub-ranges there-between.

Non-limiting examples of the first binder include polymers selected from polyvinyl alcohol (PVOH), latex, an acrylic polymer, polymaleic anhydride, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

The binder may be thixotropic. The term "thixotropic" refers to a composition that has a high viscosity (e.g., 40,000 cps) at low-shear and a low viscosity (e.g., 800 cps) at high-shear. Non-limiting examples of thixotropic binder include polymers selected from polyvinyl alcohol (PVOH), aforementioned latex, acrylic polymer, polymaleic anhydride, or a combination of two or more thereof.

The binder may be a thixotropic polymeric having a Tg that is less than room temperature ("Tm"). In a preferred embodiment, the second binder is a thixotropic polymeric binder having a. Tg less than 20° C. —preferably less than 19° C. The binder may be film-forming and having a minimum film-forming temperature of about 12° C. The term "film-forming temperature" refers to the temperature at which a composition forms a film.

The edge coating 230 may further comprise a dispersant. The dispersant may be present in the edge coating 230 in an amount ranging from about 0.1 wt. % to about 2.0 wt. % based on the total dry-weight of the edge coating 230—including all wt. % and sub-ranges there-between. In a preferred embodiment, the dispersant may be present in the edge coating 230 in an amount ranging from about 0.1 wt. % to about 1.5 wt. % based on the total dry-weight of the edge coating 230—including all wt. % and sub-ranges there-between. The dispersant may be ionic in nature—i.e., comprise one or more ionic groups such as anionic group or cationic group. In a preferred embodiment, the ionic group is anionic.

According to some embodiments, the dispersant may comprise an anionic polyacrylic polymer having a salt group formed from a neutralization of an acid group with a compound forming a cation. For examples, the polymer may comprise one or more pendant side chains comprising a terminal carboxylic acid group that is neutralized with sodium or ammonia to form a carboxylate anion and a sodium cation and/or ammonium cation. Alternatively, the polymer may comprise one or more pendant side chains comprising a terminal sulfonic acid group that is neutralized with the aforementioned sodium or ammonia compounds to form a salt group.

In other embodiments, the dispersant may be non-ionic. Non-limiting examples of non-ionic surfactant include, but at not limited to non-ionic alcohol ethoxylate surfactant. Other examples of ionic dispersant include, but at not limited to, phosphate polyether ionic surfactant.

The edge coating 230 may further comprise a wetting agent. The wetting agent may be present in the edge coating 230 in an amount ranging from about 0.2 wt. % to about 2.0 wt. % based on the total dry-weight of the edge coating 230—including all wt. % and sub-ranges there-between. In a preferred embodiment, the wetting agent may be present in the edge coating 230 in an amount ranging from about 0.8 wt. % to about 1.8 wt. % based on the total dry-weight of the edge coating 230—including all wt. % and sub-ranges there-between.

The wetting agent is a type of surfactant that lowers the surface tension between two liquids or between a liquid and a solid. The wetting agent may comprise a hydrophobic portion and a hydrophilic portion. The hydrophobic portion may be a long aliphatic chain derived from a fatty alcohol. In other embodiments, the hydrophobic portion may comprise one or more aromatic groups. The wetting agent may be non-ionic, whereby the hydrophilic portion includes an ethoxylated chain. In a preferred embodiment, the wetting agent is non-ionic, whereby the hydrophobic portion comprises at least one aromatic group. The wetting agent may comprise two or more aromatic groups. Non-limiting examples of wetting agent include three aromatic groups, such as tristyrylphenol ethoxylate.

The solids content of the edge coating composition may range from about 70 wt. % to about 90 wt. %—including all wt. % and sub-ranges there-between. In a preferred embodiment, the solids content of the edge coating composition may range from about 72 wt. % to about 78 wt. % based on the total weight of the edge coating composition—including all wt. % and sub-ranges there-between. In a preferred embodiment, the solids content of the edge coating composition may range from about 75 wt. % to about 76 wt. % based on the total weight of the edge coating composition—including all wt. % and sub-ranges there-between. In some embodiments, the edge coating composition may have a solids content of at least 75 Wt. % based on the total weight of the edge coating composition.

The edge coating composition may be thixotropic. The edge coating composition may have a viscosity ranging from about 1,000 cps to about 20,000 cps as measured by a Brookfield viscometer at 10 RPM using a #4 spindle at room temperature—including all viscosities and sub-ranges there-between. In a preferred embodiment, the edge coating composition may have a viscosity ranging from about 4,000 cps to about 8,000 cps as measured by a Brookfield viscometer at 10 RPM using a #4 spindle at room temperature—including all viscosities and sub-ranges there-between. The edge liquid-based coating composition may comprise water as the liquid carrier, wherein the liquid carrier comprises less than 1 wt. % of VOC solvent.

The edge coating composition (i.e., wet-state) may be applied to the body side surface 123 in an amount ranging from about 10 g/m$^2$ to about 200 g/m$^2$—including all sub-ranges and values there-between. The edge coating composition may be applied to the side surface 123 of the body 120 by spray, roll, wheel coater, and vacuum coating. The edge coating composition may be applied by a DVD edge coating unit.

The edge coating composition may be dried at an elevated temperature for a drying period—wherein the elevated temperature ranges from about 120° C. to about 240° C.—including all sub-ranges and temperature there-between. The drying period may range from about 10 seconds to about 120 seconds—including all sub-ranges and temperature there-between. The resulting edge coating 230 (i.e., in the dry-state) may be present in an amount ranging from about 7.5 g/m$^2$ to about 150 g/m$^2$—including all amounts and sub-ranges there-between.

According to other embodiments, the building panel 100 may comprise a face coating 210 applied to the upper surface 121 of the body 120. The face coating 210 may comprise one or more of the previously discussed color pigments, humectants, and/or binders. The face coating 210 may further comprise one or more of the previously discussed dispersants and/or wetting agents. The face coating 210, in the dry-state, may be present on the upper surface 121 of the body 120 in an amount ranging from about 10 g/m$^2$ to about 132 g/m$^2$—including all amounts and sub-ranges there-between.

The face coating 210 may comprise an upper surface 211 opposite a lower surface 212. The face coating 210 has a face coating thickness $t_2$—as measured from the upper surface 211 to the lower surface 212 of the face coating 210. The face coating thickness $t_2$ may range from about 200 μm to about 500 μm—including all thicknesses and sub-ranges there-between. The lower surface 212 of the face coating 210 may be in direct contact with the upper surface 121 of the body 120. The upper surface 211 of the face coating 210 may form at least a portion of the first major surface 111 of the building panel 100—as discussed further herein.

The pigment may be present in the face coating 210 in an amount ranging from about 70 wt. % to about 95 wt. %—including all wt. % and sub-ranges there-between—based on the total dry-weight of the face coating 210.

The binder may be present in the face coating 210 in an amount ranging from about 5 wt. % to about 20 wt. % based on the total dry-weight of the face coating 210—including all wt. % and sub-ranges there-between. The binder in the face coating 210 may be polymeric and have a glass transition temperature ("Tg") that ranges from about 21° C. to about 40° C. —including all temperatures and sub-ranges there-between.

The humectant of the present invention may be present in the face coating 210 in an amount ranging from about 0.25 wt. % to about 2.5 wt. % based on the total dry-weight of the face coating 210—including all wt. % and sub-ranges there-between.

The dispersant may be present in the face coating 210 in an amount ranging from about 0.05 wt. % to about 2.0 wt. % based on the total dry-weight of the face coating 210 including all wt. % and sub-ranges there-between. The wetting agent may be present in the face coating 210 in an amount ranging from about 0.2 wt. % to about 1.5 wt. % based on the total dry-weight of the face coating 210—including all wt. % and sub-ranges there-between.

The face coating composition has a high-solid's content. The solids content of the face coating composition may range from about 45 wt. % to about 75 wt. %—including all wt. % and sub-ranges there-between. In a preferred embodiment, the solids content of the face coating composition may range from about 45 wt. % to about 65 wt. % based on the total weight of the face coating composition—including all wt. % and sub-ranges there-between. In some embodiments, the face coating composition may have a solids content of at least 50 wt. % based on the total weight of the face coating composition. In some embodiments, the face coating composition may have a solids content of at least 60 wt. % based on the total weight of the face coating composition.

The face coating composition may have a viscosity ranging from about 250 cps to about 2,500 cps as measured by a Brookfield viscometer at 10 RPM using a #4 spindle at room temperature—including all viscosities and sub-ranges there-between. In a preferred embodiment, the face coating composition may have a viscosity ranging from about 350 cps to about 1,500 cps as measured by a Brookfield viscometer at 10 RPM using a #4 spindle at room temperature—including all viscosities and sub-ranges there-between.

The face coating composition (i.e., in the wet-state) may be applied to the upper surface 121 of the body 120 in an amount ranging from about 26 g/m$^2$ to about 220 g/m$^2$—including all sub-ranges and values there-between. The face coating composition may be applied to the upper surface 121 by roll coating, brush coating, and spray coating, and/or curtain blade.

Once applied to the upper surface 121 of the body 120, the face coating composition may be dried in a conventional oven at an elevated temperature for a drying period. The elevated temperature may range from about 67° C. to about 232° C. —including all sub-ranges and temperature there-between. In some embodiments, the elevated temperature may range from about 67° C. to about 190° C. —including all sub-ranges and temperature there-between. The drying period may range from about 10 seconds to about 120 seconds—including all sub-ranges and temperature therebetween. The resulting face coating 210 may be present on the upper surface 121 of the body 120 in an amount ranging from about 10 g/m² to about 132 g/m²—including all amounts and sub-ranges there-between.

Although not shown, the building panel 100 of the present invention may further comprise a non-woven scrim. The non-woven scrim may comprise an upper surface opposite a lower surface. The lower surface of the non-woven scrim may be positioned immediately adjacent to and in direct contact with the upper surface 121 of the body 120. The face coating 210 may be applied to the non-woven scrim such that the lower surface 212 of the face coating 210 is in direct contact with the upper surface of the non-woven scrim.

Referring now to FIGS. 1 and 4, the resulting building panel 100 may comprise the face coating 210 whereby the first major surface 111 of the building panel 100 comprises the upper surface 211 of the face coating 210 and the face coating 210 comprises pigment and humectant, Thus, in the installed state, at least a portion of the upper surface 211 of the face coating 210 faces the active room environment 2. The face coating 210 may be substantially continuous. The term "substantially continuous" means less than 5% of the available surface area on the referenced surface contains pin-holing or blistering.

According to other embodiments, the building panel 100 may comprise a surface coating 200 applied to the side surface 123 of the body 120 to form an edge coating 230. The edge coating 230 may comprise one or more of the previously discussed pigments and humectant.

According to the embodiments where the building panel 100 comprises the edge coating 230, the side surface 113 of the building panel 100 may comprise the edge coating 230, Specifically, the side surface 113 of the building panel 100 may comprise the outer surface 231 of the edge coating 230. Thus, the outer surface 231 of the edge coating 230 may for the upper portion 11:3a and the lower portion 113b of the side surface 113 of the building panel 100. Specifically, the upper portion 113a of the side surface 113 may comprise an upper edge coating portion 231a and the lower portion 113b of the side surface 113 may comprise a lower edge coating portion 231b.

Although not pictured, some embodiments of the present invention include a building panel comprising a surface coating 200 comprising only the edge coating 230. Specifically, the building panel 100 may comprise a first major surface opposite a second major surface and a side surface extending there-between. The side surface 113 of the building panel 100 may comprise the edge coating 230, the first major surface 111 of the building panel 100 may comprise the upper surface 121 of the body 120 and the second major surface 112 of the building panel 100 may comprise the lower surface 122 of the body 120.

Although not pictured, some embodiments of the present invention include a building panel comprising a surface coating 200, wherein the surface coating 200 comprises only the face coating 210. Specifically, the building panel 100 may comprise a first major surface 111 opposite a second major surface 112 and a side surface 113 extending therebetween. The first major surface 111 of the building panel 100 may comprise the upper surface 211 of the face coating 210, the second major surface 112 of the building panel 100 may comprise the lower surface 122 of the body 120, and the side surface 113 of the building panel 100 may comprise the body side surface 123.

Referring now to FIG. 4, building panels 300, 400, 500 are illustrated in accordance with other embodiments of the present invention. The building panels 300, 400, and 500 are similar to building panel 100 except as described herein below. The description of building panel 100 above generally applies to building panels 300, 400, and 500 described below except with regard to the differences specifically noted below. A similar numbering scheme will be used for the building panels 300, 400, and 500 as with building panel 100 except that the 300-, 400-, and 500-series of numbers will be used.

Figure 5:
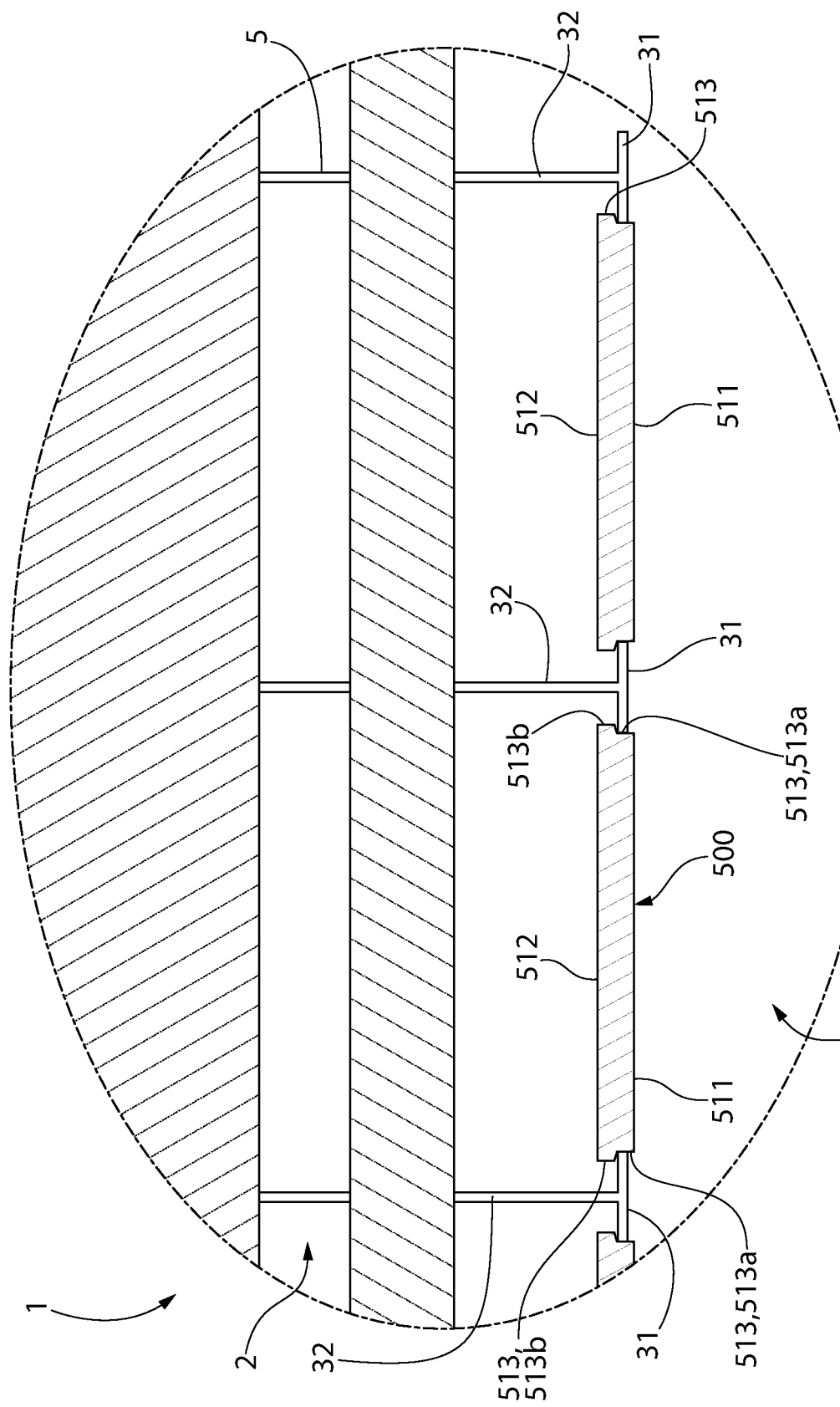
FIG. 5 is a close-up view of a ceiling system comprising the coated building panel according to an alternative embodiment of the present invention, the close-up view being the portion identified by oval V in FIG. 3.
Figure 6:
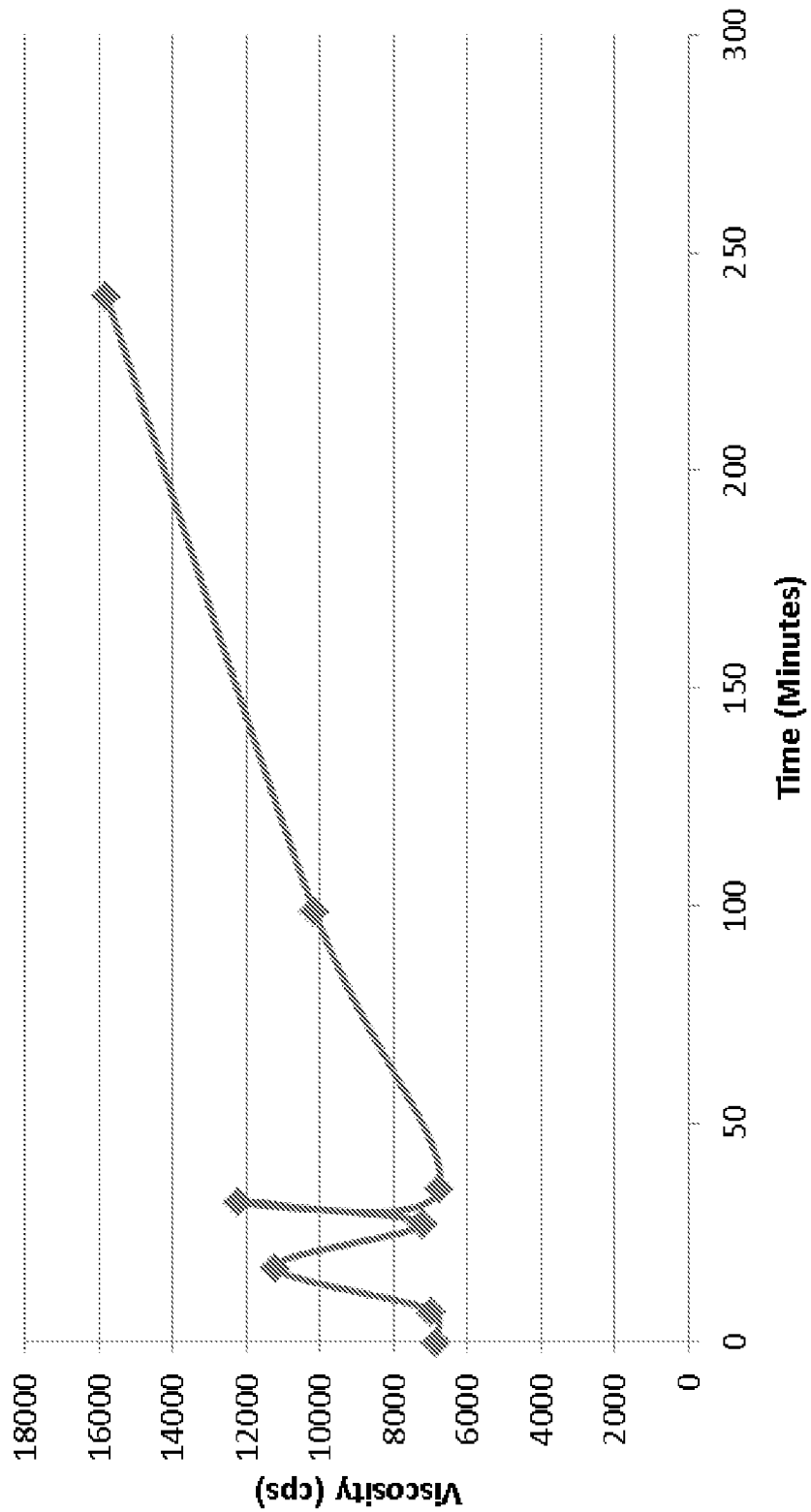
FIG. 6 is a graphical representation of viscosity increase of a comparative coating composition.
Figure 7:
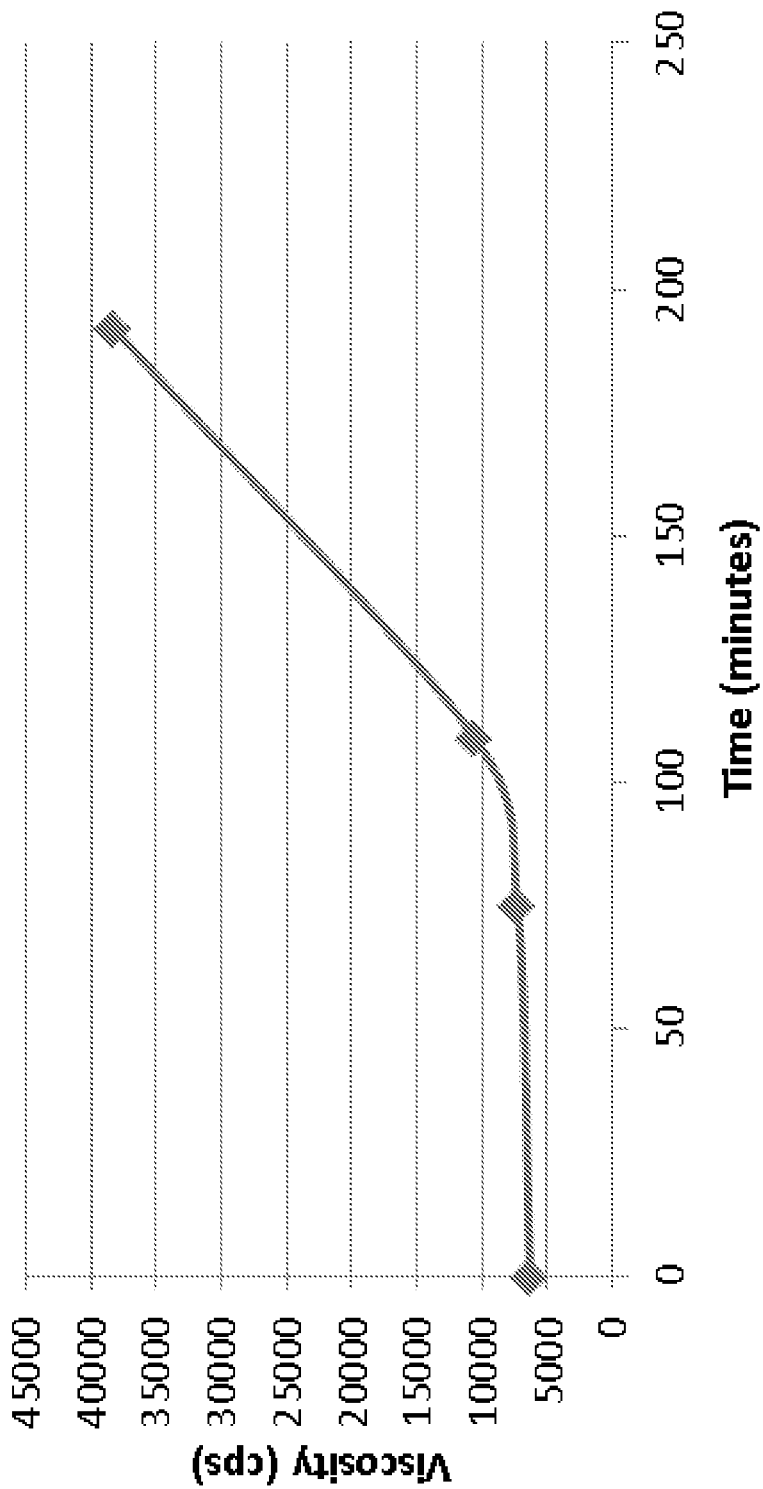
FIG. 7 is a graphical representation of viscosity increase of a comparative coating composition.

Referring now to FIG. 5, the building panel 500 may be installed according to the second variation, as described herein. The building panel 500 may be positioned such that the upper portion 513a of the side surface 513 is below the horizontal flange 31, thereby extending into the active room environment 2. In the second variation, the lower portion 513b of the side surface 513 is above the horizontal flange 31 extending into the plenum space 3. In the second variation, the first major surface 511 and the upper portion 513a of the side surface 513 of the building panel 500 is exposed to the active room environment 2. In the second variation, the lower portion 513b of the side surface 513 may be concealed from the active room environment 2. The lower portion 513b of the side surface 513 may be adjacent to at least a portion of the vertical web 32 as viewed along a horizontal direction. The lower portion 513b of the side surface 513 as well as the second major surface 512 may be exposed to the plenum space 3.

According to these embodiments, the upper portion 513a and the lower portion 513b may comprise the surface coating 200—specifically, the first face coating 210. According to these embodiments, the first major surface 511 may comprise the surface coating 200—specifically, the edge coating 230. Therefore, the surface coating 200 may be exposed to the active room environment on the first major surface 511 and the upper portion 513a of the side surface 513 of the building panel 500 in the installed state.

Referring now to FIGS. 9-14, a building system 1000 is illustrated in accordance with other embodiments of the present invention. The building system 1000 comprises a plurality of bodies 1120 and surface coating 1200 that are similar to body 120 and surface coating 200 except as described herein below. The description of body 120 and the surface coating 200 above generally applies to bodies 1120 and the surface coating 1200 described below except with regard to the differences specifically noted below. A similar numbering scheme will be used for the body 1120 and the surface coating 1200 as with body 1120 and the surface coating 1200 except that the 1,000 series of numbers will be used.

The building system 1000 comprises a plurality of bodies 1120, each having a first major surface 1121 opposite a second major surface. The plurality of bodies 1120 may comprise at least a first body 1120*i* and a second body 1120*ii*, whereby a side surface 1123*i* of the first body 1120*i* is positioned immediately adjacent to a side surface 1123*ii* of the second body 1120*ii*. A seam 1020 is formed at the interface between the side surface 1123*i* of the first body 1120*i* and the side surface 1123*ii* of the second body 1120*ii*. The seam 1020 may be a small gap between the side surface 1123*i* of the first body 1120*i* and the side surface 1123*ii* of the second body 1120*ii*.

Each body 1120 may comprise a central region 1125 that is circumscribed by a perimeter region 1124. The perimeter region 1124 of each body 1120 may be adjacent to the side surface of each body 1120. Specifically, the first body 1120*i* may comprise a first perimeter portion 1124*i* and the second body 1120*ii* may comprise a second perimeter portion 1124*ii*, whereby the first and second perimeter portions 1124*i*, 1124*ii* are located adjacent to each other. Specifically, the first body 1120*i* may comprise a first central region 1125*i* and the second body 1120*ii* may comprise a second central region 1125*ii*, whereby the first and second central regions 1125*i*, 1125*ii* are separated from each other by the first and second perimeter regions 1124*i*, 1124*ii*.

The first major surface 1121 of the body 1120 may comprise both the perimeter portion 1124 and the central region 1125. In some embodiments the perimeter portion 1124, 1124*i*, 1124*ii* of each body may be coplanar with the central region 1125, 1125*i*, 1125*ii* of each corresponding body (not pictured). In other embodiments, the perimeter portion 1124, 1124*i*, 1124*ii* may be oriented at an oblique angle relative to the central region 1125, 1125*i*, 1125*ii* of the corresponding body.

Each body 1120, 1120*i*, 1120*ii* may be secured to a support member 1005 comprising a support surface 1010. In a non-limiting example, each body 1120, 1120*i*, 1120*ii* may be secured to the support surface 1010 of the support member 1005 by fastener, adhesive, or the like. The first and second body 1120*i*, 1120*ii* may be fastened to the support member 1005 such that the seam 1020 is located between the adjacent most side surfaces 1123*i*, 1123*ii* of the first and second bodies 1120*i*, 1120*ii*.

The first major surface 1121, 1121*i*, 1121*ii* of each body 1120, 1120*i*, 1120*ii* may exhibit a first aesthetic appearance. The term "aesthetic appearance" may refer to a color, texture, or combination thereof. In a non-limiting example, the first aesthetic appearance may be a first color.

Figure 11:
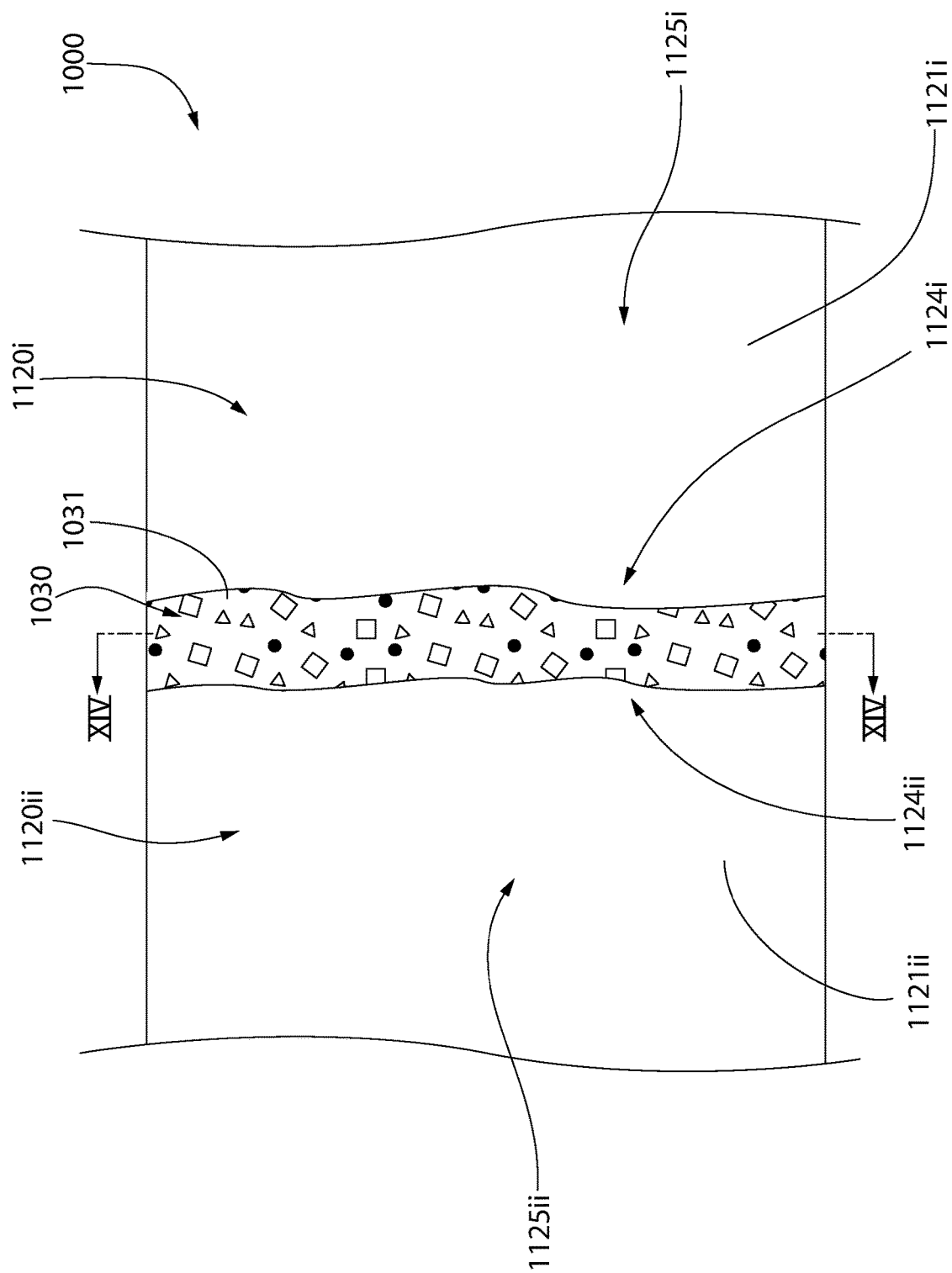
FIG. 11 is a front view of a portion of the building system of FIG. 9.
Figure 12:
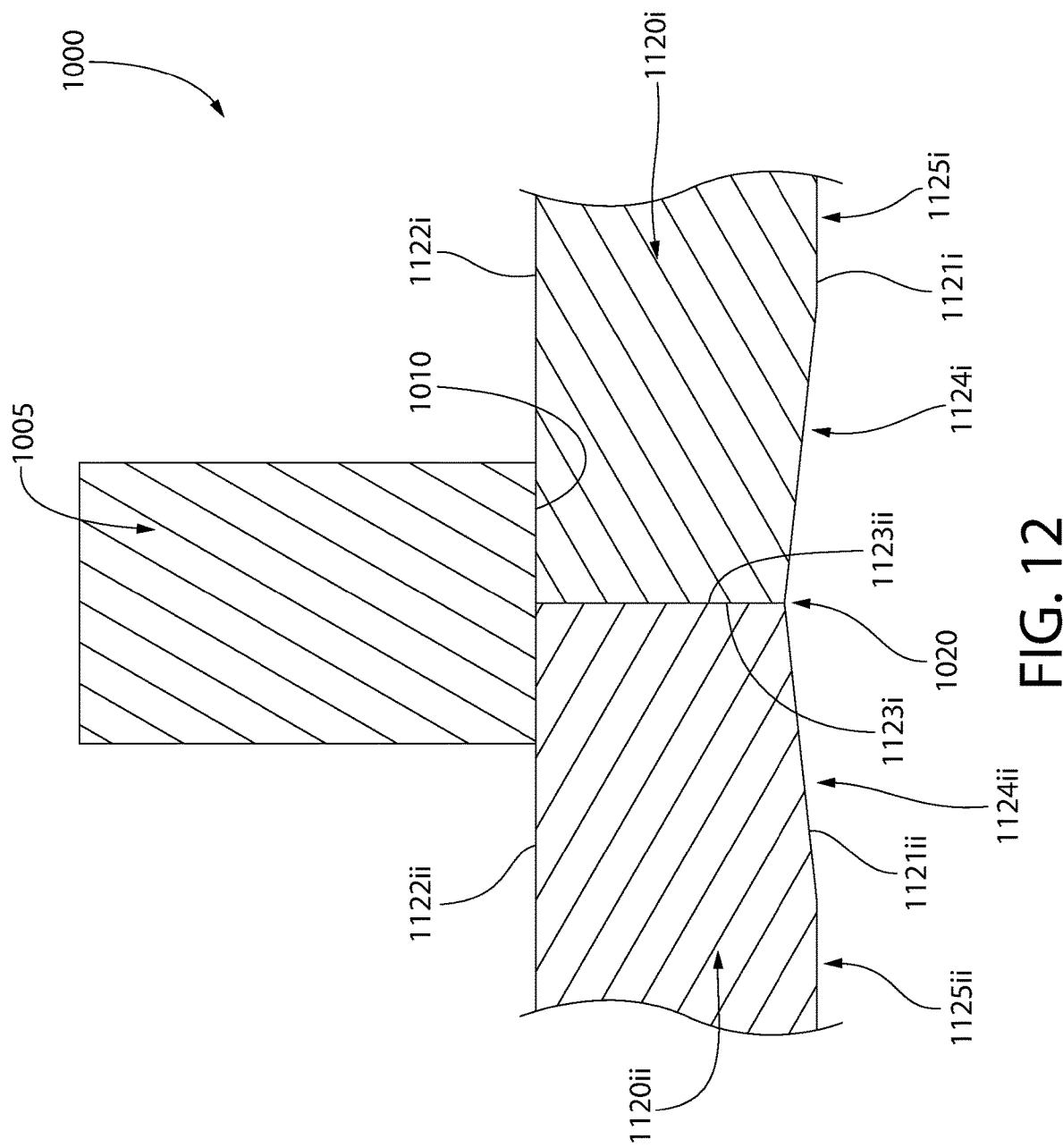
FIG. 12 is a cross-sectional view of a portion of the building system of FIG. 10 along line XII-XII.
Figure 13:
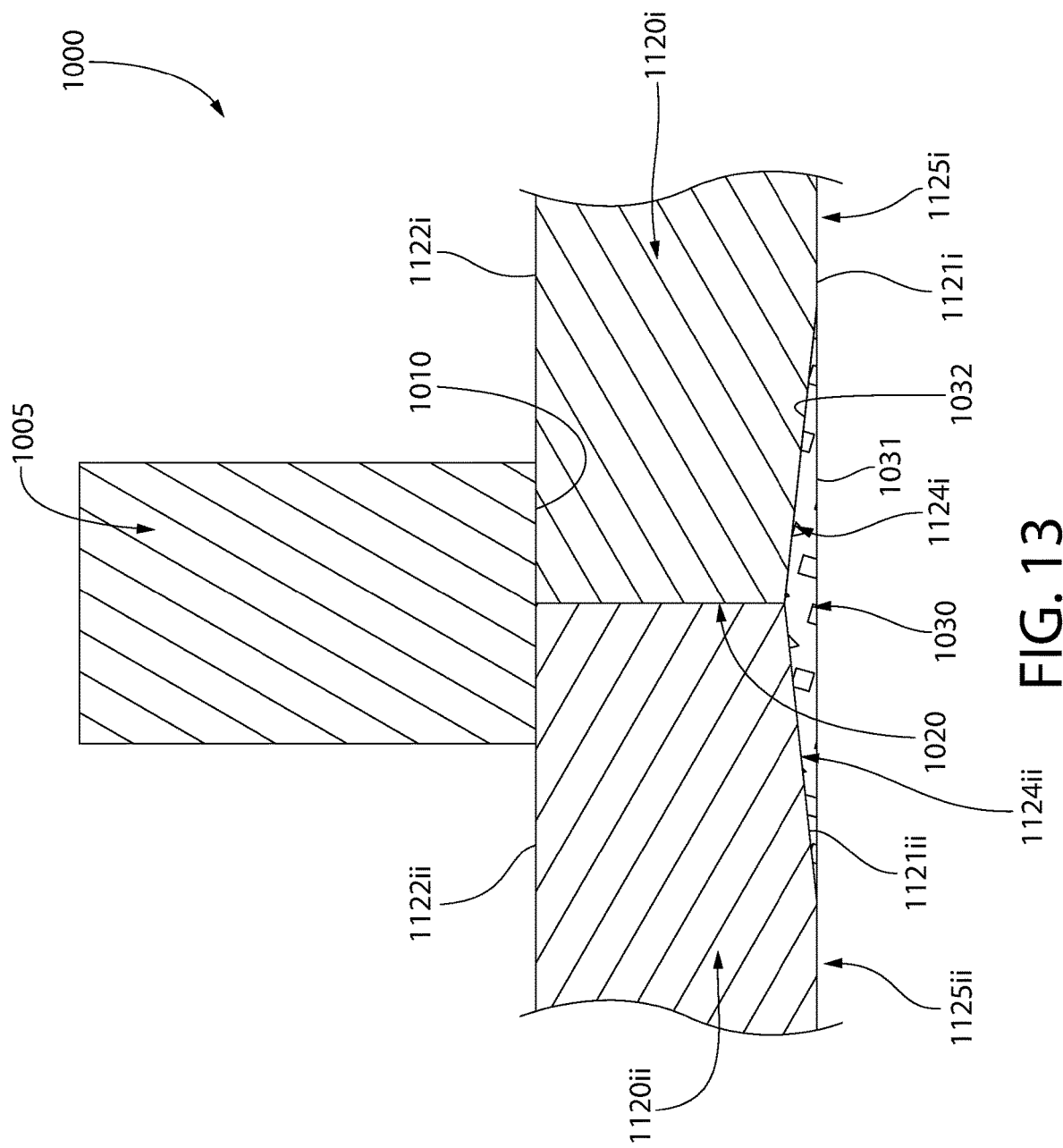
FIG. 13 is a cross-sectional view of a portion of the building system of FIG. 11 along line XIII-XIII.
Figure 14:
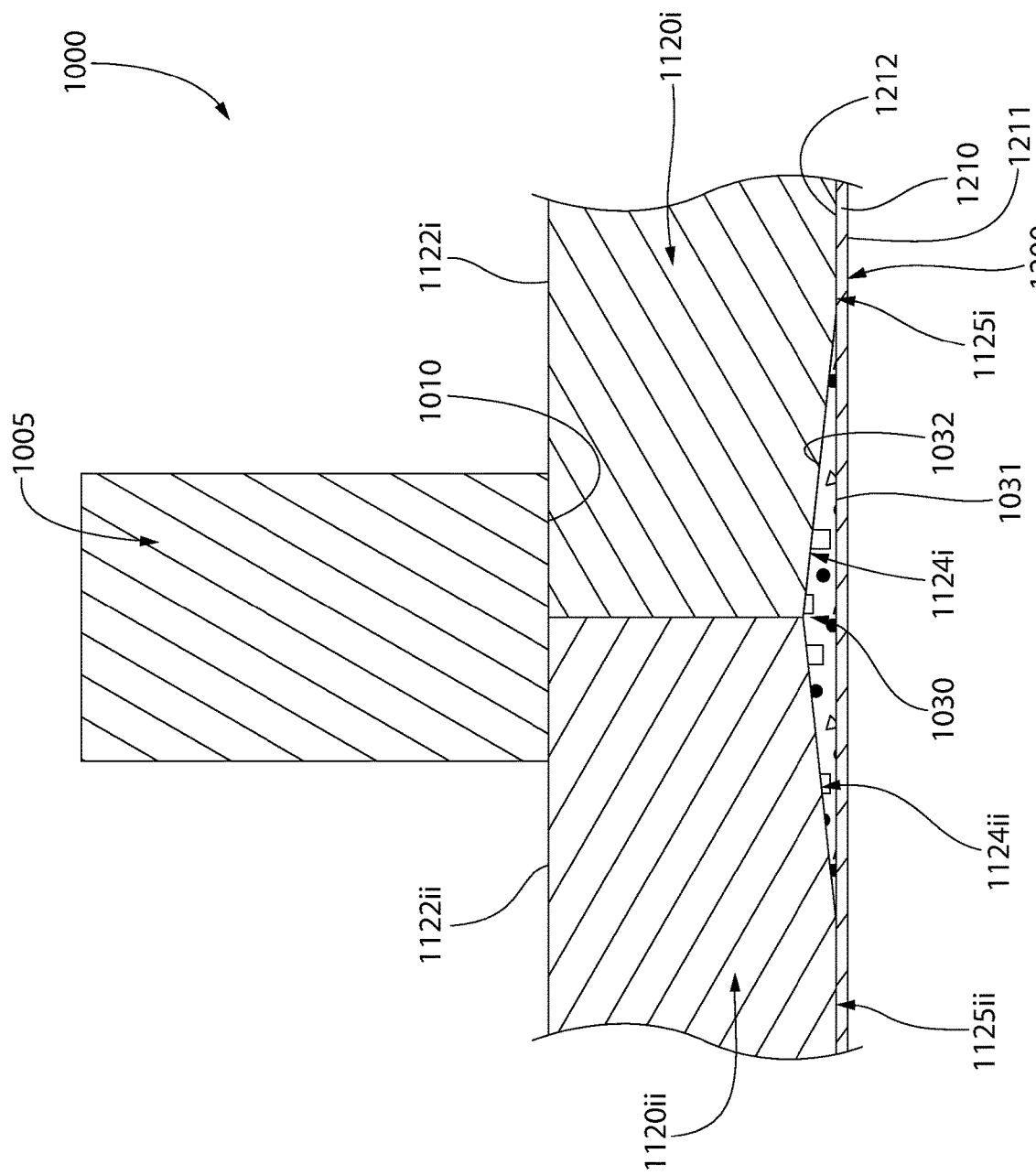
FIG. 14 is a cross-sectional view of the building system of FIG. 9 along line XIV-XIV.

Referring now to FIGS. 11 and 13, a seam-filling material 1030 may be applied to the first and second bodies 1120*i*, 1120*ii* such that seam 1020 is covered with the seam-filling material 1030. Specifically, the seam-filling material 1030 may be applied continuously across the first perimeter portion 1124*i* of the first body 1120*i*, the perimeter portion 1124*ii* of the second body 1120*ii* and the seam 1020 formed there-between.

The seam-filling material may be formed of a putty. In some embodiments, the putty may comprise gypsum, lime, cement, or the like. In a non-limiting embodiment, the putty comprises gypsum and may be commonly be referred to as "spackle." The seam-filling material may be provided in a wet-state with a liquid carrier such as water. The seam-filling material may be applied to the bodies 1120, 1120*i*, 1120*ii* in the wet-state by an application tool (e.g., a spackle blade), and allowed to dry for a period of time until substantially all liquid carrier is driven off from the seam-filling material, leaving just the solid components of the putty remaining.

In the dry-state, the seam-filling material 1030 may conceal the seam 1020 present between the first and second bodies 1120*i*, 1120*ii*. The resulting seam-filling material 1030 may comprise an exposed surface 1031 as well as a concealed surface 1032, whereby the exposed surface 1031 faces substantially the same direction as the first major exposed surfaces 1121*i*, 1121*ii* of the first and second bodies 1120*i*, 1120*ii*. Additionally, the concealed surface 1032 of the seam-filling material may face toward the first major exposed surfaces 1121*i*, 1121*ii* of the first and second bodies 1120*i*, 1120*ii*

Additionally, the seam-filling material 1030 may occupy a volume created by the different orientation of the perimeter portion 1124*i*, 1124*ii* relative to the central regions 1125*i*, 1125*ii* of the bodies 1120*i*, 1120*ii* such that an exposed surface 1131 of the seam-filling material 1130 may be substantially coplanar with the exposed surface of the central regions 1125*i*, 1125*ii* of the first and second bodies 1120*i*, 1120*ii*.

In the dry-state, the seam-filling material 1030 may exhibit a second aesthetic value. The second aesthetic value may be different from the first aesthetic value. Therefore, when viewing the first major surface 1121*i* of the first body 1120*i*, the first major surface 1121*ii* of the second body 1120*ii*, and the exposed surface 1131 of the seam-filling material 1130, there may be a noticeable different in aesthetics between the first major surfaces 1121*i*, 1121*i* of the first body 1120*i* and the second body 1120*ii* as compared to the exposed surface 1131 of the seam-filling material 1130 when viewing with the naked eye within the room environment.

Therefore, according to the present invention, the surface coating 1200 may be applied as a face coating 1210 to the first major surface 1121*i*, 1121*ii* of the first and second bodies 1120*i*, 1120*ii* as well as the exposed surface 1131 of the seam-filing material 1130. The face coating 1210 may be applied in the wet-state continuously by spray, thereby forming a substantially uniform coating on the first major surface 1121*i*, 1121*ii* of the first and second bodies 1120*i*, 1120*ii* as well as the exposed surface 1131 of the seam-filing material 1130.

Once the face coating 1210 dries into the dry-state, the face coating 1210 may exhibit a third aesthetic value. The third aesthetic value may be the same or different from each of the first and second aesthetic values. The resulting face coating 1210 exhibits such uniformity that it simultaneously conceals the first and second aesthetic values of the first major surface 1121*i*, 1121*ii* of the first and second bodies 1120*i*, 1120*ii* as well as the exposed surface 1131 of the seam-filing material 1130—thereby resulting in a single continuous appearance that conceals to the naked eye any aesthetic variations created by the difference between the first and second aesthetic values.

According to this embodiment, the face coating 1210 according to this embodiment may comprise one or more of the previously discussed binders, pigments, and viscosity modifier. The face coating 1210, in the dry-state, may be present on the first major surface 1121 of the plurality of bodies 1120 and the exposed surface 1131 of the seam-filling material 1130 in an amount ranging from about 10 g/m² to about 132 g/m²—including all amounts and sub-ranges there-between.

The face coating 1210 may comprise an upper surface 1211 opposite a lower surface 1212, whereby the face coating 1210 has a face coating thickness $t_2$—as measured from the upper surface 1211 to the lower surface 1212 of the face coating 1210. The face coating thickness $t_2$ may range from about 200 µm to about 500 µm—including all thicknesses and sub-ranges there-between. The lower surface 1212 of the face coating 1210 may be in direct contact with the first major surface 1121 of the body 1120. The upper surface 1211 of the face coating 1210 may form at least a portion of the exposed surface of the building system 1000.

The pigment may be present in the face coating 1210 in an amount ranging from about 70 wt. % to about 95 wt. %—including all wt. % and sub-ranges there-between—based on the total dry-weight of the face coating 1210.

The binder may be present in the face coating 1210 in an amount ranging from about 5 wt. % to about 20 wt. % based on the total dry-weight of the face coating 210 including all wt. % and sub-ranges there-between. The binder in the face coating 1210 may be polymeric and have a Tg of at least 20° C. In a preferred embodiment, the Tg of the binder may be at least 30° C. In some embodiments, the Tg may range from about 21° C. to about 40° C. —including all temperatures and sub-ranges there-between.

The binder in the face coating 1210 may have a neutral to basic pH. In particular, the binder may have a pH ranging from about 7.0 to about 9.0—including all pHs and sub-ranges there-between. In some embodiments, the binder may have a pH ranging from about 7.0 to about 8.0—including all pHs and sub-ranges there-between.

According to the present invention, the pigment and binder may be present in a weight ratio of at least about 5:1—based on the total dry weight of the pigment and binder. The pigment and binder may be present in a weight ratio ranging from about 5:1 to about 20:1—based on the total dry weight of the pigment and binder. In some embodiments, the pigment and binder may be present in a weight ratio of at least about 7:1—based on the total dry weight of the pigment and binder. In some embodiments, the pigment and binder may be present in a weight ratio of at least about 10:1—based on the total dry weight of the pigment and binder.

The humectant of the present invention may be present in the face coating 1210 in an amount ranging from about 0.25 wt. % to about 2.5 wt. % based on the total dry-weight of the face coating 210—including all wt. % and sub-ranges there-between.

The dispersant may be present in the face coating 1210 in an amount ranging from about 0.05 wt. to about 2.0 wt. % based on the total dry-weight of the face coating 1210—including all wt. % and sub-ranges there-between. The wetting agent may be present in the face coating 1210 in an amount ranging from about 0.2 wt. to about 1.5 wt. % based on the total dry-weight of the face coating 1210—including all wt. % and sub-ranges there-between.

According to this embodiment of the present invention, the viscosity modifier may comprise a blend of dispersant and humectant—whereby the humectant and dispersant are present in a weight ratio ranging from about 4:1 to about 1:1—including all ratios and sub-ranges there-between. In a preferred embodiment, the humectant and dispersant may be present in a weight ratio ranging from about 3:1 to about 1:1—including all ratios and sub-ranges there-between.

According to this embodiment, the face coating 210 may be formed from a composition having a high solid's content ranging from about 45 wt. % to about 75 wt. %—including all wt. % and sub-ranges there-between. In a preferred embodiment, the solids content of the face coating composition may range from about 45 wt. % to about 65 wt. % based on the total weight of the face coating composition—including all wt. % and sub-ranges there-between.

The face coating in the wet-state) may be applied to the upper surface 1121 of the body 1120 in an amount ranging from about 26 g/m² to about 220 g/m²—including all sub-ranges and values there-between. The face coating composition may be applied to the upper surface 1121 by roll coating, brush coating, and spray coating, and/or curtain blade. In a preferred embodiment, the face coating 1210 may be applied by spray coating.

Although not shown, the building system 1000 of the present invention may further comprise a non-woven scrim applied to the first major surfaces 1121, 1121i, 1121ii of the multiple bodies 1120, 1120i, 1120ii as well as the expose surface 1131 of the seam-filling material 1130.

In addition to the previously discussed aesthetic properties, the face coating 1210 of this embodiment may provide superior acoustical properties. Specifically, the resulting face coating 1210 may exhibit an airflow resistance ranging from about 50 MKS Rayls to about 34,000 MKS Rayls—including all airflow resistances and sub-ranges there-between. In a preferred embodiment, the resulting face coating 1210 may exhibit an airflow resistance ranging from about 50 MKS Rayls to about 1,000 MKS Rayls—including all airflow resistances and sub-ranges there-between. In some embodiments, the resulting face coating 1210 may exhibit an airflow resistance ranging from about 50 MKS Rayls to about 500 MKS Rayls—including all airflow resistances and sub-ranges there-between.

The invention will be described in greater detail by way of specific examples. The following examples are offered for illustrative purposes and are not intended to limit the invention in any manner.

EXAMPLES

Viscosity Stabilization Experiments

A first set of experiments were prepared to test the viscosity stabilization using the humectant of the present invention. The experiments provided herein use the following humectant compositions:

Humectant 1 ("H1"): blend of ester-containing humectants including sugar-based esters and glycol-based esters at 65 wt. % solids and 35 wt. % water.
Humectant B ("HB"): propylene glycol
Humectant C ("HC"): ether-containing humectant (dipropylene glycol monoethylether)

The binder ("Binder A") used in the following examples includes a carboxylated polyvinyl acetate homopolymer at a solid's content of 50 wt. %, having a Tg of about 37° C., and having a pH ranging between 7 and 8. The experiments use a pigment composition that is a blend of $TiO_2$, $CaCO_3$, and calcined diatomaceous earth. The thickener used includes a blend of hydroxyethyl cellulose and hydrous magnesium aluminum-silicate. The experiments provided herein may also use the following dispersing agents:

Dispersant 1 ("D1"): ionic surfactant (sodium polyacrylate)—commercially available as Nopcote 63900
Dispersant 3 ("D3"): non-ionic surfactant—commercially available as TMN-6

Each example was prepared by mixing together the components at 23° C. (room temperature). The formulations of each example are set forth herein in Table 1. The coating compositions were applied to fibrous bodies formed from inorganic fiber—e.g., mineral wool.

TABLE 1

| Wt. % | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Water | 13.0 | 14.2 | 14.4 | 12.5 | 12.5 | 10.5 | 13.4 | 11.5 | 9.5 | 11.5 | 9.5 |
| Binder A | 21.1 | 21.1 | 21.1 | 21.1 | 21.2 | 21.2 | 19.6 | 21.2 | 21.2 | 21.2 | 21.2 |
| H1 | — | — | — | — | — | — | — | — | — | 1.0 | 3.0 |
| H2 | — | — | — | — | — | 2.0 | — | — | — | — | — |
| H3 | — | — | — | — | — | — | 5.8 | 1.0 | 3.0 | — | — |

TABLE 1-continued

| Wt. % | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| D1 | 0.5 | 0.1 | 0.2 | — | — | — | — | — | — | — | — |
| D2 | 0.3 | 0.1 | 0.2 | 0.2 | 0.2 | 0.2 | 0.1 | 0.2 | 0.2 | 0.2 | 0.2 |
| Pigment | 42.6 | 42.6 | 44.0 | 44.0 | 42.0 | 42.0 | 38.8 | 42.0 | 42.0 | 42.0 | 42.0 |
| Wetting Agent | — | — | — | 1.0 | 1.0 | 1.0 | 0.9 | 1.0 | 1.0 | 1.0 | 1.0 |
| Flame Retardant | 17.0 | 17.0 | 18.5 | 18.5 | 17.6 | 17.7 | 16.3 | 17.7 | 17.7 | 17.7 | 17.7 |
| Mica | 4.0 | — | — | 0.5 | 4.0 | 4.0 | 3.7 | 4.0 | 4.0 | 4.0 | 4.0 |
| Kaolin | — | 4.0 | 1.0 | 1.0 | 0.5 | 0.5 | 0.5 | 0.5 | 0.5 | 0.5 | 0.5 |
| Thickener | 0.6 | 0.6 | 0.3 | 0.5 | 0.5 | 0.3 | 0.4 | 0.3 | 0.3 | 0.3 | 0.3 |
| Biocide | 0.1 | 0.1 | 0.1 | 0.1 | 0.1 | 0.1 | 0.1 | 0.1 | 0.1 | 0.1 | 0.1 |
| Defoamer | 0.8 | 0.2 | 0.2 | 0.5 | 0.5 | 0.5 | 0.5 | 0.5 | 0.5 | 0.5 | 0.5 |
| Solid's Content | 75.6 | 75.4 | 75.1 | 75.5 | 75.8 | 76.6 | 75.6 | 75.0 | 75.0 | 76.0 | 76.5 |
| Density (g/mL) | — | 1.65 | 1.69 | 1.63 | 1.68 | 1.57 | 1.57 | 1.64 | 1.39 | 1.67 | 1.62 |

As demonstrated by Table 1, Examples 6-11 are exemplary of the coating composition of the present invention as they contain humectants, and Examples 10 and 11 are particularly preferred as the humectant is an ester-containing humectant. Each coating composition, however, contains about the same solid's content, whereby the liquid carrier is water. The viscosity of each mixture was then measured using a #4 spindle at various RPMs. Additionally, each coating composition was run through a DVD edge coating unit, whereby the viscosity of each coating composition was closely monitored. The results of the viscosity measurements are set forth below in Table 2.

measured again to determine whether there had been an increase in viscosity. The results of each measurement for the first one-hour period are set forth in Table 1. Regarding Example 1, while the coating composition exhibited an initial viscosity of about 5,210 cps when tests on a Brookfield Viscometer with a #4 spindle at 10 RPM, after 1 hour in the DVD edge unit, the viscosity had increased so much that the coating composition was too thick to apply to a fibrous body. Therefore, no further viscosity measurements could be made to this coating composition nor could this coating composition be applied to a fibrous body through the DVD edge coating unit.

TABLE 2

| Initial Viscosity Measurement (cps) | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 0.5 rpm | — | 196000 | 100800 | 112800 | 46400 | 64800 | 79200 | 80000 | 185600 | 49200 | 57200 |
| 10 rpm | 5120 | 22600 | 7240 | 9020 | 4120 | 5010 | 6320 | 7280 | 15920 | 5020 | 6480 |
| 60 rpm | — | 5187 | 1700 | 2493 | 1253 | 1483 | 1960 | 2167 | 4247 | 1617 | 2227 |
| 100 rpm | — | 3492 | 1178 | 1800 | 920 | 1136 | 1468 | 1528 | 2916 | 1164 | 1630 |
| Humectant | None | None | None | None | None | B | C | C | C | A | A |
| Increase in Viscosity After 1 Hour | Y | Y | Y | Y | N | N | N | N | N | N | N |
| Increase in Viscosity After 2 Hour | N/A | Y | Y | Y | Y | N | N | N | N | N | N |
| Proper Coating Hardening After Cure | N/A | N | N | N | Y | N | N | N | N | Y | Y |
| Blistering in Coating After Cure | N/A | Y | Y | Y | Y | Y | Y | Y | Y | N | N |
| Cracking in Coating After Cure | N/A | Y | Y | Y | Y | N | N | Y | Y | N | N |

Each coating composition was then placed into a DVD edge coating unit, whereby the coating composition was introduced into a reservoir from which it recirculated through the DVD edge coating unit as a portion of the coating composition was applied to an edge of a fibrous body. The recirculation of the coating composition continued for a period of one hour before the viscosity of the coating composition that remained in the reservoir was Regarding Examples 2-4, each coating composition exhibited an increase in viscosity after just one-hour in the DVD edge coating unit. The increase in viscosity is undesirable as it indicates poor pot-life and unsuitable for large-scale manufacturing. The coating compositions of Examples 2-4 were then further recirculated in the DVD edge coating unit for a second hour, during which the coating compositions continued to be applied to an edge of fibrous bodies. At the end of the second hour the viscosities of each coating composition had increased to a point where they were unworkable, requiring that DVD edge coating unit stop running and the reservoir and the coating head of the DVD edge coating unit be cleaned to remove build-up of the highly viscosity coating compositions. The work-stoppage and cleaning is highly undesirable. The coating composition of Examples 2-4 that managed to be applied to the fibrous body was then cured and evaluated for proper hardening, blistering, and/or cracking. Each coating composition of Examples 2-4 exhibited insufficient hardness (i.e., the coated building panel was too soft), blistering, and/or cracking.

It can be seen that by using only surfactants to affect viscosity (both ionic and non-ionic) does little to prevent or even prolong an increase in viscosity in the costing composition. In fact, even when additional amounts of the ionic dispersant DA1 are added to the coating composition around the 25-minute mark, the reduction in viscosity is only temporary, whereby it then continues to increase with time again. Thus, while using non-ionic and/or ionic surfactants may be helpful to achieving the desired initial viscosity, such surfactants do little to stabilize the viscosity over prolonged periods of processing time. while the addition viscosity may be relative stable for a non-humectant coating composition for one hour Regarding Example 5, the addition of a wetting agent to the coating composition may cause the coating composition to withstand an increase in viscosity for the first one-hour period. However, the addition of the wetting agent alone still does not prevent an increase in viscosity for prolonged periods of time, much like the other comparative coatings. Rather, the addition of the wetting agent only prevents an increase in viscosity until the second one-hour period in the DVD edge unit—which indicates that surfactants and wetting agents alone cannot stabilize the viscosity over prolonged periods of processing time.

Referring now Examples 6-11, the addition of a humectant wetting agent to the coating composition provides enhanced viscosity stabilization as none of the coatings exhibited blistering and/or cracking when comprising humectants other than the ester-containing humectants of the present invention.

Figure 8:
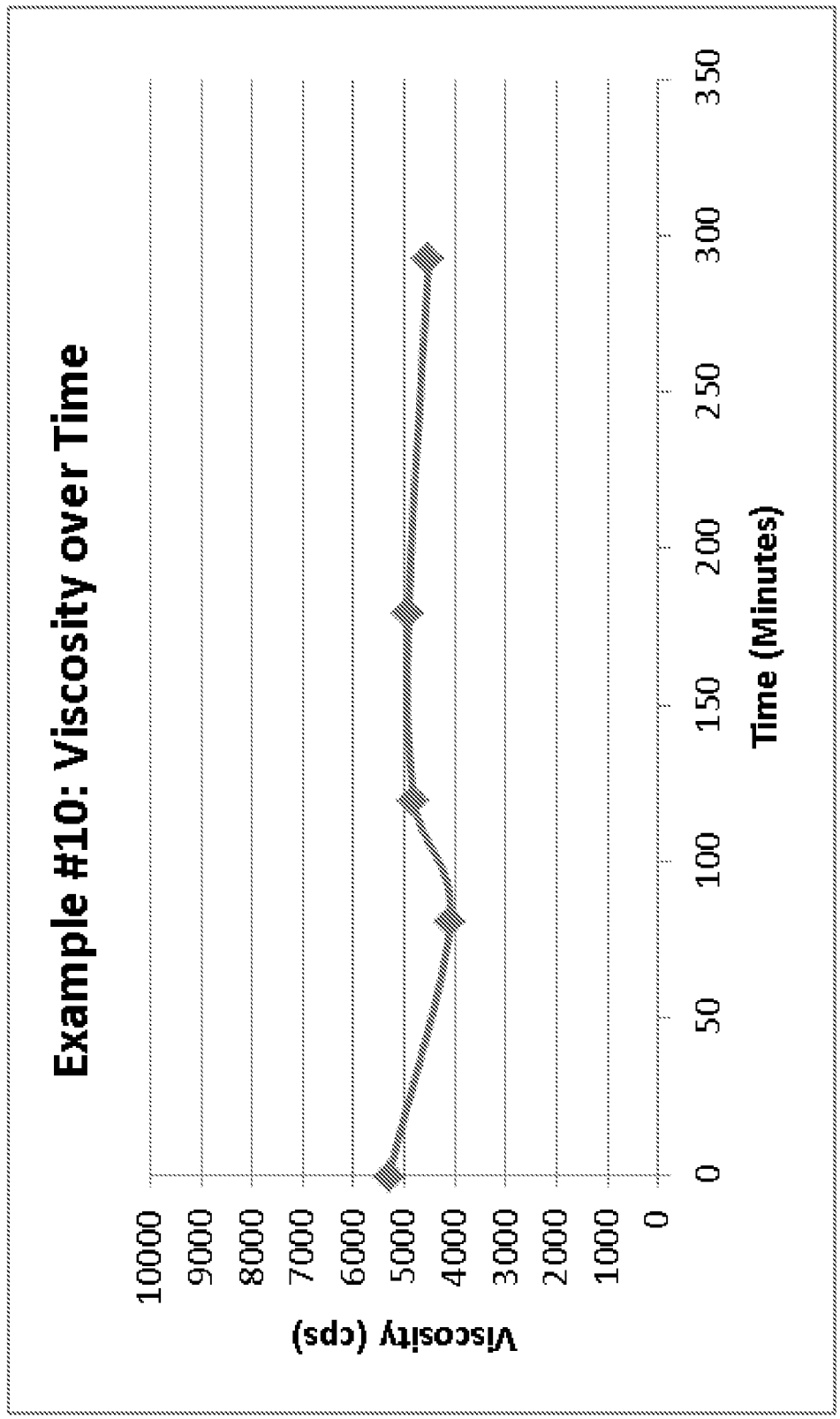
FIG. 8 is a graphical representation of viscosity increase of the coating composition according to the present invention.
Figure 9:
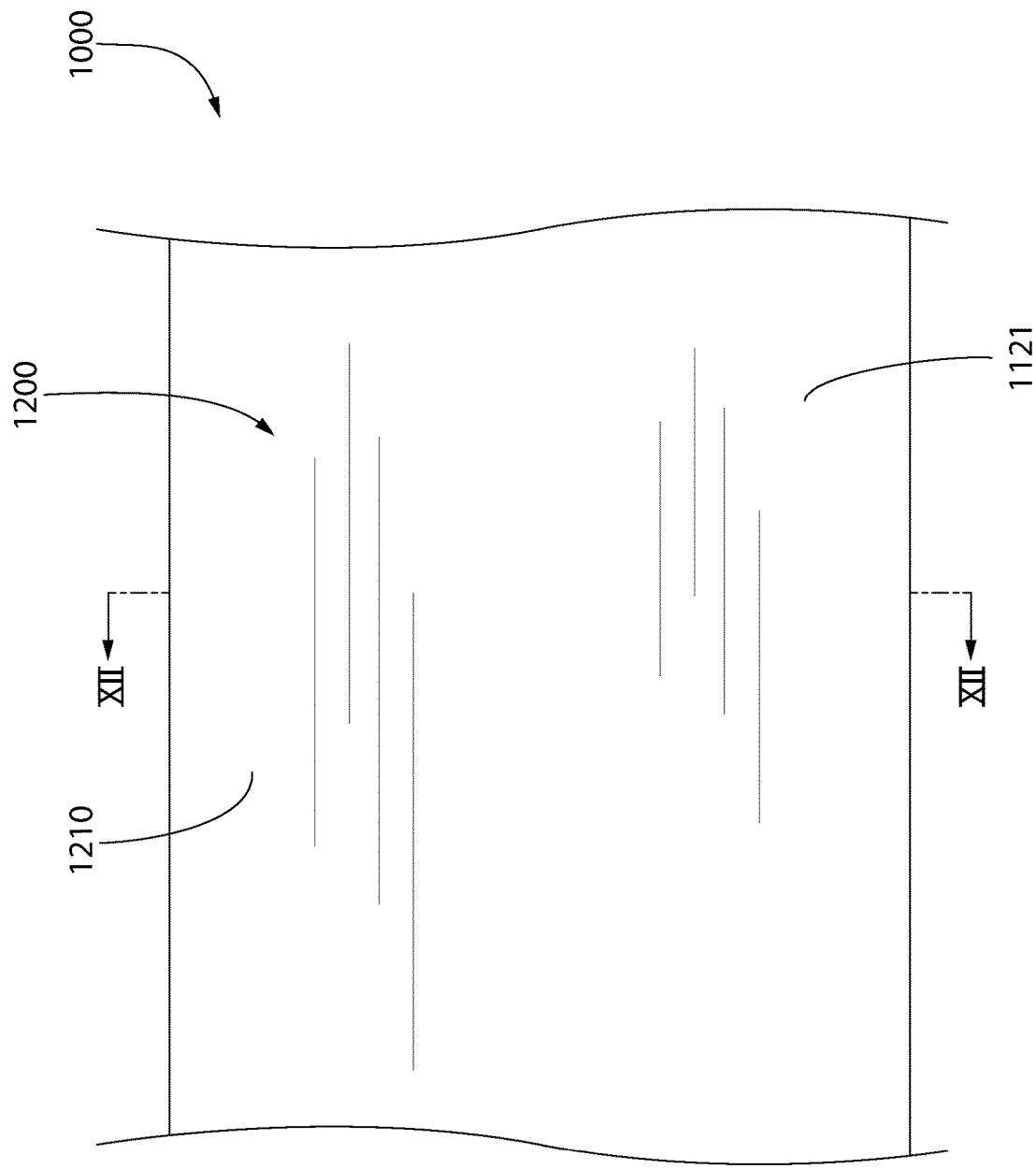
FIG. 9 is a front view of a building system according to another embodiment of the present invention.
Figure 10:
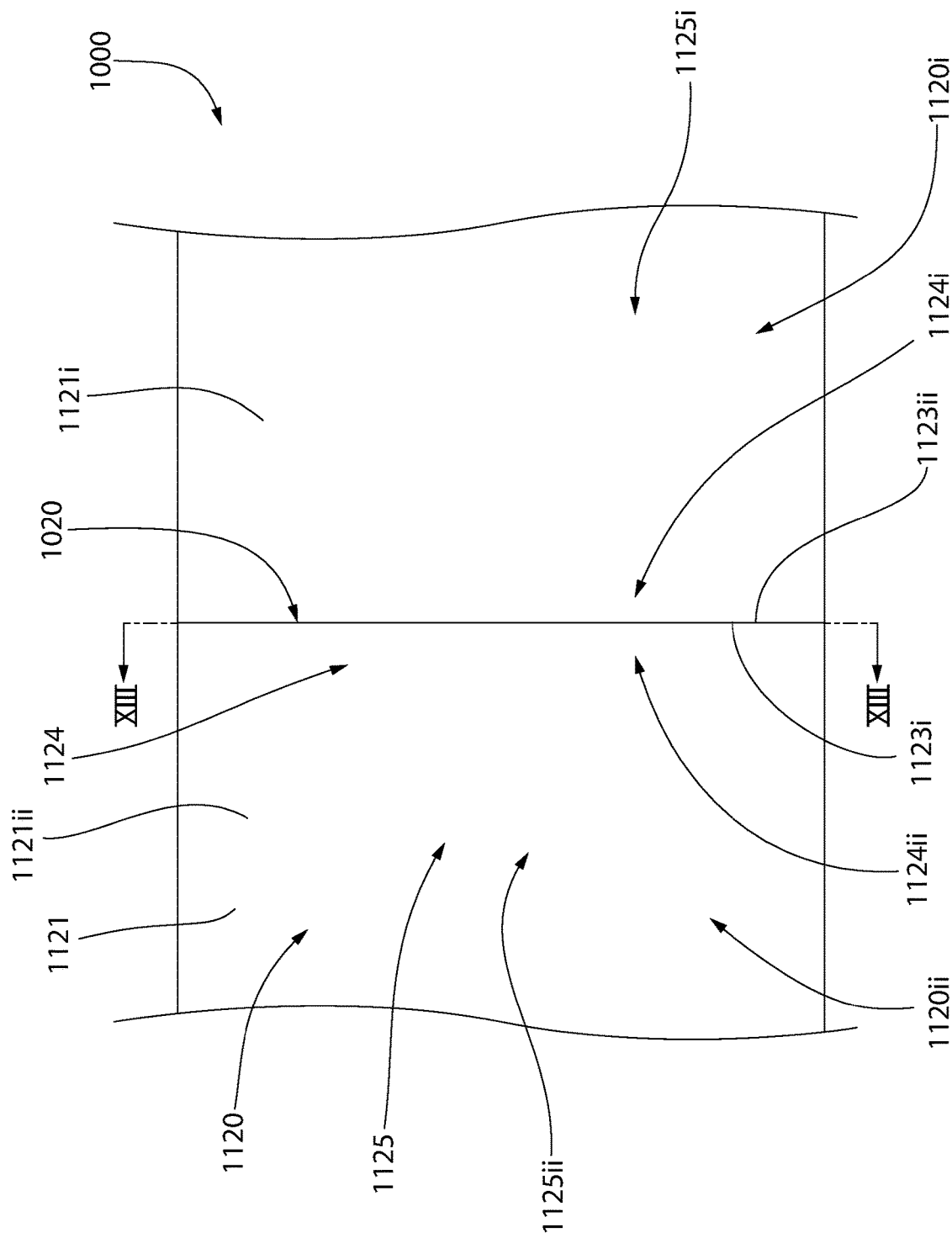
FIG. 10 is a front view of a portion of a building system of FIG. 9.

Referring now to Examples 10 and 11, when using the ester-based humectants of the present invention not only do the coating compositions exhibit superior viscosity stabilization over prolonged periods of time (see FIG. 8), but it has been surprisingly discovered that such compositions can be applied and cured to coatings that have no blistering or cracking.

Additionally, it has been surprisingly discovered that the cured coatings are hard coatings that are ideal on a building panels. Moreover, there has been a discovery of the surprising benefit of using the ester-based humectant (as compared to other humectants) with building panel bodies that are formed from inorganic fiber. Specifically, when applying the coating composition that contains the ester-based humectant, result inorganic fiber containing body maintains sufficient hardness and the body does not soften. TO the contrary, the coating compositions comprising the non-ester containing humectants resulted in the inorganic fiber bodies themselves to soften. This result not only creates inferior coatings but undermines the entire building panel. These characteristics are summarized below in Table 3.

TABLE 3

| Coating Example | Humectant | Inorganic Fiber Body Stiffness |
| --- | --- | --- |
| Ex. 10 | 1 | Hard |
| Ex. 11 | 1 | Hard |
| Ex. 6 | 2 | Soft |
| Ex. 7 | 3 | Soft |
| Ex. 8 | 3 | Soft |
| Ex. 9 | 3 | Soft |

The aesthetic properties of each coating were then evaluated by measuring the color and gloss of each coating. The results of the aesthetic evaluation are set forth below in Table 4.

TABLE 4

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- | --- | --- |
| Color Values | | | | | | | | | | | |
| L | — | 96.32 | 96.81 | 96.77 | 96.03 | — | — | 95.87 | 95.3 | 95.96 | 95.8 |
| a | — | −0.39 | −0.54 | −0.55 | −0.47 | — | — | −0.48 | −0.5 | −0.53 | −0.52 |
| b | — | 3.78 | 3.52 | 3.41 | 3.4 | — | — | 3.36 | 3.58 | 3.3 | 3.38 |
| LR | — | 90.78 | 91.98 | | 90.07 | — | — | 89.69 | 88.34 | 89.91 | 89.52 |
| Gloss Values | | | | | | | | | | | |
| 85° | | 2.4 | 2.9 | — | 3 | — | — | 2.3 | 1.8 | 2.4 | 2.4 | exhibited a fatal increase in viscosity over the course of two hours in the DVD edge coating unit. Thus, the addition of humectant to the coating composition overcomes the setbacks in viscosity stabilization when using only surfactants to control viscosity. However, as demonstrated by Examples 6-9, other setbacks may arise when using a humectant other than an ester-containing humectant. For example, when adding a glycol humectant (i.e., HB of Example 6) or an ether containing humectant (i.e., HC of Examples 7-9), the viscosity may be stable over a prolonged period of time, however, the resulting coating composition fails to properly cure and results in soft coatings that are inadequate as coatings on a building panel. Additionally, some coatings As demonstrated by Table 4, it has also been discovered that using humectant in a coating composition that is coated to at least one major surface of fibrous substrate does not result in a detrimental impact to the color and gloss performance when compared to non-humectant containing coatings. Specifically, the color values of the humectant-containing coating composition of Examples 8-11 are comparable to that of the coatings that do not comprise the humectant. Furthermore, it has been surprisingly discovered that when using the ester-based humectant (i.e., Examples 10 and 11), superior gloss values can be obtained in the final coating as compared to the coatings containing humectants without an ester group (i.e., Examples 8 and 9).

Monolithic Aesthetic Experiments

A second set of experiments were prepared to test the aesthetic and acoustical properties of the coating composition of the present invention. Although not limited to, the present set of experiments are particularly useful in monolithic spray applications of the coating. The second set of experiments provided herein use the following humectant compositions:

Clay—powdered hectorite clay having a d94 of less than <200 mesh, commercially available as Bentone HD Humectant 1 ("H1"): blend of ester-containing humectants including sugar-based esters and glycol-based esters at 65 wt. % solids and 35 wt. % water.

Humectant 3 ("H3"): ether-containing humectant (dipropylene glycol monoethylether) 100% solids Dispersant 1 ("D1"): ionic surfactant (sodium polyacrylate)—45 wt. % active and 55 wt. % carrier Dispersant 2 ("D2"): phosphate polyether ionic surfactant—35 wt. % and 65 wt. % carrier Dispersant 3 ("D3"): non-ionic alcohol ethoxylate surfactant—90 wt. % solids and 10 wt. % carrier Pigments
  Titanium Dioxide ($TiO_2$)
  Alumina Trihydrate
  Calcined Diatomite (also referred to as "Diatomaeous Earth")
  Calcium Carbonate ($CaCO_3$)

Binder A—polyvinyl acetate copolymer having a Tg of about 37° C. and a pH of about 7.0, and having a solid's content of about 50 wt. %, commercially available as Polyco 2160

Binder B—acrylic copolymer having a Tg of about 36° C. and a pH of about 4.2 to 5.2, and a having solid's content of about 42.5 wt. %, commercially available as Neocryl XK-350

Binder C—100% acrylic polymer having a Tg of about −22° C. and a pH of about 7.0 to 8.0, having a solid's content of about 51 wt. %, commercially available as Rhoplex 2438C Binder D—blend of hydroxyethyl cellulose and surfactant stabilized vinyl acetate ethylene copolymer having a Tg of about 18° C., and having a solid's content of about 55 wt. %, commercially available as Vinnapas EZ222

Binder E—styrene acrylic copolymer having a Tg of about 37° C. and a pH of about 7.5-9.0, and having a solid's content of about 51 wt. %, commercially available as Ecronova KDA 1004 eco Additive 1—anti-microbial agent, thickener, defoamer Additive 2—anti-microbial agent, thickener, defoamer Each example was prepared by mixing together the components at 23° C. (room temperature).

A first set of experiments were performed by applying each coating composition across two adjacent building panels with a seam formed there-between. Each coated surface was then evaluated for aesthetic values (e.g., color value, gloss value), acoustical value, and ease of application. Each evaluation was assigned a value of fail (F), pass (P), and high pass (HP). The results are set forth below in Table 5.

TABLE 5

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|---|
| Reference | 86B | 88A | 93B | 95A | 96A | 96B | 98A | 101A | 102A | 105C | Primer | JHPF3 | 81A | 81B | 83A |
| Water | 19.9 | 22.5 | 24.8 | 23.8 | 23.9 | 23.9 | 22.5 | 22.3 | 20.9 | 20.9 | 13.6 | 16.9 | 13.6 | 13.6 | 18.8 |
| Clay | — | — | — | 1.2 | 1.2 | 1.2 | 0.1 | 0.1 | 0.1 | 0.1 | — | — | — | — | — |
| H1 | 1.5 | 1.4 | 1.4 | 1.4 | 1.4 | 1.4 | 1.4 | 2.0 | 1.9 | 1.9 | 1.6 | 1.5 | — | 1.6 | 1.5 |
| H3 | — | — | — | — | — | — | — | — | — | — | — | — | 1.6 | — | — |
| D2 | 0.6 | 0.6 | 0.6 | 0.6 | 0.6 | 0.6 | 0.6 | 0.6 | 0.7 | 0.7 | 0.6 | 0.6 | 0.6 | 0.6 | 0.6 |
| D3 | 0.2 | 0.1 | 0.1 | 0.3 | 0.1 | 0.1 | 0.1 | 0.1 | 0.1 | 0.1 | 0.2 | 0.2 | 0.2 | 0.2 | 0.2 |
| $TiO_2$ | 27.6 | 26.7 | 25.9 | 25.8 | 25.9 | 25.8 | 26.7 | 26.6 | 31.1 | 31.1 | 29.8 | 28.7 | 29.8 | 29.8 | 28.0 |
| Alumina Trihydrate | 5.9 | 5.7 | 5.5 | 5.5 | 5.5 | 5.6 | 5.7 | 5.7 | 5.3 | 5.3 | 6.4 | 6.1 | 6.4 | 6.4 | 6.0 |
| Calcined Diatomite | 8.6 | 8.3 | 8.1 | 8.0 | 8.0 | 8.0 | 8.3 | 8.3 | 7.7 | 7.7 | 9.3 | 8.9 | 9.3 | 9.3 | 8.7 |
| $CaCO_3$ | 27.6 | 26.8 | 26.0 | 25.8 | 25.8 | 25.8 | 26.7 | 26.5 | 24.9 | 24.9 | 29.8 | 28.7 | 29.9 | 29.9 | 28.1 |
| Binder A | — | — | — | — | — | — | — | — | — | — | 8.5 | 8.2 | 8.5 | 8.5 | 8.0 |
| Binder E | 7.9 | 7.7 | 7.4 | 7.4 | 7.4 | 7.4 | 7.7 | 7.6 | 7.1 | 7.1 | — | — | — | — | — |
| Additive 1 | 0.2 | 0.2 | 0.2 | 0.2 | 0.2 | 0.2 | 0.2 | 0.2 | 0.2 | 0.2 | 0.2 | 0.2 | 0.1 | 0.1 | 0.1 |
| Total (Wet) | 100 | 100 | 100 | 100 | 100 | 100 | 100 | 100 | 100 | 100 | 100 | 100 | 100 | 100 | 100 |
| Ratio of Pigment to Binder | 8.8:1 | 8.8:1 | 8.8:1 | 8.8:1 | 8.8:1 | 8.8:1 | 8.8:1 | 8.8:1 | 9.7:1 | 9.7:1 | 8.8:1 | 8.8:1 | 8.8:1 | 8.8:1 | 8.8:1 |
| Solid % | 74.9 | 72.6 | 70.3 | 70.2 | 70.1 | 70.2 | 72.6 | 72.5 | 74.2 | 74.2 | 80.7 | 77.7 | 80.7 | 82.2 | 77.2 |
| Aesthetic Pass/Fail | HP | HP | HP | HP | HP | HP | HP | HP | HP | HP | P | P | P | P | P |
| Spray Pass/Fail | HP | HP | HP | HP | HP | HP | HP | HP | HP | HP | HP | HP | HP | HP | HP |
| Acoustic Pass/Fail | P | P | P | P | P | P | P | P | P | P | P | P | P | P | P |

TABLE 6

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
|  | 134 | JH Finish | 38C | 80A | 80B | 81A | 81B |
| Water | 19.1 | 24.1 | 13.6 | 13.6 | 13.6 | 18.8 | 20.3 |
| Clay | — | — | — | — | — | — | — |
| H1 | 3.4 | 1.1 | 1.6 | 1.6 | — | 1.5 | 1.5 |
| H2 | — | — | — | — | 1.6 | — | — |
| D2 | 0.6 | 0.6 | 0.6 | 0.6 | 0.6 | 0.6 | 0.6 |
| D3 | 0.1 | 0.1 | 0.2 | 0.2 | 0.2 | 0.2 | 0.1 |
| TiO2 | 46.6 | 26.2 | 29.8 | 29.9 | 29.9 | 28.1 | 27.5 |
| Alumina Trihydrate | 5.7 | 5.6 | 6.4 | 6.4 | 6.4 | 6.0 | 5.9 |
| Calcined Diatomite | 8.9 | 8.1 | 9.3 | 9.3 | 9.3 | 8.7 | 8.5 |
| CaCO3 | 7.1 | 26.2 | 29.8 | 29.8 | 29.8 | 28.0 | 27.6 |
| Binder A | 8.3 | — | — | — | — | — | — |
| Binder B | — | 7.8 | — | — | — | — | — |
| Binder C | — | — | 8.5 | — | — | — | — |
| Binder D | — | — | — | 8.5 | 8.5 | 8.0 | 7.9 |
| Additive 1 | 0.2 | 0.2 | 0.2 | 0.1 | 0.1 | 0.1 | 0.1 |
| Total | 100 | 100 | 100 | 100 | 100 | 100 | 100 |
| Pigment to Binder Ratio | 8.2:1 | 8.4:1 | 8.8:1 | 8.8:1 | 8.8:1 | 8.8:1 | 8.8:1 |
| Solid's Content | 74.8 | 70.8 | 80.7 | 80.7 | 80.7 | 76.9 | 74.9 |
| Aesthetic Pass/Fail | F | F | F | F | F | F | F |
| Spray Pass/Fail | F | F | F | F | F | F | F |
| Acoustic Pass/Fail | N/A | N/A | N/A | N/A | N/A | N/A | N/A |

As demonstrated by Table 5, Examples 12-26 are exemplary of the coating composition of the present invention as they contain a high pigment to binder ratio, and a binder having a Tg of at least 18° C. and a neutral to basic pH, and a humectant to dispersant ratio of less than 4:1. The amounts set forth in Table 5 correspond to the total solid amounts of each coating composition. The coating when applied in the wet included a carrier that comprises water and various solvents. The corresponding solid's content of each coating in the wet state is also set forth in Table 5. Additionally, as demonstrated by Table 6, coating compositions formed from binders with an acidic pH and/or Tg below 20° C. result in inferior spray performance and/or final coating performance. Additionally, as demonstrated by Table 6, coating compositions formed humectant to dispersant blend that is greater than 4:1 fails to provide the desired coating performance.

A second set of experiments were performed by applying each coating composition across two adjacent panels with a seam formed there-between. Each coated surface was then evaluated for airflow resistance and gloss value. The results are set forth below in Tables 7 and 8.

TABLE 7

|  | Ex. 110 | Ex. 260 | Ex. 361 | Ex. 462 | Ex. 563 | Ex. 664 | Ex. 766 | Ex. 871 | Ex. 973 | Ex. 1075 | Ex. 11 jp3 |
| --- | --- | --- | --- | --- | --- | --- | --- | --- | --- | --- | --- |
| H1 | — | 1.3 | 1.3 | — | — | — | — | 1.2 | 1.3 | 1.3 | 1.3 |
| D1 | 0.3 | — | — | 0.3 | 0.3 | 0.3 | 0.3 | — | — | — | — |
| D2 | — | 0.3 | 0.3 | — | — | — | — | 0.3 | 0.3 | 0.3 | 0.3 |
| D3 | 0.1 | 0.2 | 0.2 | 0.1 | 0.1 | 0.1 | 0.1 | 0.2 | 0.2 | 0.2 | 0.2 |
| TiO$_2$ | 64.4 | 36.7 | 37.3 | 66.5 | 64.6 | 62.6 | 60.8 | 35.5 | 35.6 | 37.5 | 36.7 |
| Alumina Trihydrate | 16.9 | 7.9 | 8.0 | 17.4 | 16.9 | 16.4 | 17.0 | 7.6 | 7.6 | 8.0 | 7.9 |
| Calcined Diatomite | 11.8 | 11.4 | 11.7 | 12.2 | 14.7 | 14.3 | 14.8 | 11.1 | 11.1 | 11.7 | 11.4 |
| CaCO$_3$ | — | 36.8 | 31.5 | — | — | — | — | 35.6 | 35.7 | 37.6 | 36.8 |
| Binder A | — | 5.3 | 5.4 | — | — | — | — | 4.5 | 4.0 | 3.4 | 5.3 |
| Binder B | 6.3 | — | — | 3.3 | 3.2 | 6.1 | 3.2 | — | — | — | — |
| Additive 2 | 0.3 | 0.2 | 4.4 | 0.2 | 0.2 | 0.2 | 3.9 | 4.1 | 4.2 | 0.1 | 0.1 |
| Total (Solid) | 100 | 100 | 100 | 100 | 100 | 100 | 100 | 100 | 100 | 100 | 100 |
| Pigment/Binder | 14.8:1 | 15.7:1 | 16.4:1 | 29.1:1 | 30.0:1 | 15.3:1 | 28.9:1 | 19.9:1 | 22.5:1 | 27.9:1 | 17.5:1 |
| Solid's Content of Wet Coating | 71.8% | 78.0% | 72.5% | 74.1% | 74.7% | 73.6% | 72.8% | 78.2% | 78.4% | 80.1% | 80.6% |

TABLE 8

|  |  | Ratio | Application Amount (g/ft$^2$) | MKS Rayls | 85 degree gloss |
| --- | --- | --- | --- | --- | --- |
| 10 | Ex. 1A | 14.8:1 | 39.2 | 125.7 | 2.3 |
| 10 | Ex. 1B | 14.8:1 | 60.2 | 218.4 | 2.7 |
| 10 | Ex. 1C | 14.8:1 | 79.8 | 4,824.6 | 5.6 |

TABLE 8-continued

| | | Ratio | Application Amount (g/ft$^2$) | MKS Rayls | 85 degree gloss |
|---|---|---|---|---|---|
| 10 | Ex. 1D | 14.8:1 | 121.5 | 14,043.0 | 3.4 |
| 60 | Ex. 2A | 15.7:1 | 40.6 | 102.5 | 0.9 |
| 60 | Ex. 2B | 15.7:1 | 80.0 | 606.3 | 4.4 |
| 60 | Ex. 2C | 15.7:1 | 123.4 | 21,822.9 | 3.5 |
| 61 | Ex. 3A | 16.4:1 | 42.2 | 82.7 | 0.2 |
| 61 | Ex. 3B | 16.4:1 | 53.2 | 606.3 | 0.3 |
| 61 | Ex. 3C | 16.4:1 | 79.1 | 5338.0 | 1.1 |
| 62 | Ex. 4A | 29.1:1 | 41.1 | 59.3 | 0.6 |
| 62 | Ex. 4B | 29.1:1 | 81.0 | 172.3 | 1.6 |
| 62 | Ex. 4C | 29.1:1 | 120.6 | 344.3 | 1.2 |
| 63 | Ex. 5A | 30.0:1 | 41.7 | 63.5 | 1.3 |
| 63 | Ex. 5B | 30.0:1 | 80.7 | 97.7 | 1.4 |
| 63 | Ex. 5C | 30.0:1 | 92 | 342.0 | 2.0 |
| 63 | Ex. 5D | 30.0:1 | 122.1 | 205.0 | 1.7 |
| 64 | Ex. 6A | 15.3:1 | 40.4 | 168.6 | 1.8 |
| 64 | Ex. 6B | 15.3:1 | 80.7 | 5,097.3 | 9.3 |
| 64 | Ex. 6C | 15.3:1 | 120.1 | 34,637.2 | 4.7 |
| 66 | Ex. 7A | 28.9:1 | 39.1 | 66.1 | 0.0 |
| 66 | Ex. 7B | 28.9:1 | 80.0 | 215.2 | 0.5 |
| 66 | Ex. 7C | 28.9:1 | 87.0 | 221.8 | 1.0 |
| 66 | Ex. 7D | 28.9:1 | 119.0 | 413.7 | 2.1 |
| 71 | Ex. 8A | 19.9:1 | 39.7 | 566.2 | — |
| 73 | Ex. 9A | 22.5:1 | 40.0 | 264.6 | — |
| 75 | Ex. 10A | 27.9:1 | 39.2 | 549.1 | — |
| Jp3 | Ex. 11A | 17.5:1 | 38.8 | 228.2 | — |

As demonstrated by Table 8, the coating compositions of the present invention may have extremely large ratios of pigment to binder and still may be spray-applied to a building surface to give an acoustically transparent and aesthetically pleasing coating.

What is claimed is:

1. A building system comprising:
   a first building panel positioned adjacent to a second building panel, and a seam formed between the first and second building panels;
   a seam-filling material applied to the seam;
   a coating applied to the first and second building panels and the seam-filling material, the coating comprising:
      a binder having a pH of at least about 7.0 and a Tg of at least 20° C.;
      a pigment; and
      a viscosity modifier;
   wherein the pigment and the binder are present in a weight ratio of at least about 5:1;
   wherein the viscosity modifier comprises a humectant and a dispersant; and
   wherein the humectant and the dispersant are present in a weight ratio ranging from about 1:1 to about 4:1; and
   wherein the pigment comprises titanium dioxide, calcium carbonate, alumina trihydrate, and diatomaceous earth.

2. The building system according to claim 1, wherein the Tg of the binder is at least 30° C.

3. The building system according to claim 1, wherein the binder is a styrene acrylic copolymer.

4. The building system according to claim 3, wherein the styrene acrylic copolymer has a pH ranging from about 7.5 to about 9.

5. The building system according to claim 1, wherein the binder is polyvinyl acetate.

6. The building system according to claim 5, wherein the polyvinyl acetate has a pH of about 7.0.

7. The building system according to claim 1, wherein the humectant is selected from the group consisting of ester-containing humectants including sugar-based esters and glycol-based esters.

8. The building system according to claim 1, wherein the dispersant comprises an ionic dispersant.

9. The building system according to claim 1, wherein the dispersant comprises a non-ionic dispersant.

10. The building system according to claim 1, wherein the pigment and the binder are present in a weight ratio of at least 7:1.

11. The building system according to claim 1, wherein the coating is applied in an amount ranging from about 10 g/ft$^2$ to about 70 g/ft$^2$.

12. The building system according to claim 1, wherein the seam-filling material comprises gypsum plaster.

13. The building system according to claim 1,
   wherein each of the first and second building panels comprise a first major surface opposite a second major surface and a side surface extending between the first and second major surfaces, and the seam is located between adjacent side surfaces of the first and second building panel, and
   wherein the seam-filling material is applied to a portion of the first major surface of the first building panel and a portion of the first major surface of the second building panel; and
   wherein the coating is applied continuously across the first major surface of the first building panel, the seam-filling material, and the first major surface of the second building panel.

14. The building system according to claim 13, wherein the first major surface of the first building panel has a first aesthetic appearance and the seam-filling material has a second aesthetic appearance, the first aesthetic appearance being different from the second aesthetic appearance, and wherein the coating substantially masks both the first and second aesthetic appearance.

15. The building system according to claim 14, wherein the coating exhibits a maximum airflow resistance of about 1,000 MKS Rayls.

16. The building system according to claim 1, wherein the humectant comprises at least one ester bond.

17. A building system comprising:
   a first building panel and a second building panel, the first building panel positioned adjacent to the second building panel to form a seam between the first and second building panels;
   a seam-filling material applied to the seam;
   a coating applied to the first and second building panels and the seam-filling material, the coating comprising:
      a binder;
      a pigment blend comprising titanium dioxide, calcium carbonate, and diatomaceous earth; and
      a viscosity modifier;
      wherein the viscosity modifier comprises a humectant and a dispersant; and
      wherein the humectant and the dispersant are present in a weight ratio ranging from about 1:1 to about 4:1; and
      wherein the humectant comprises at least one ester bond.

18. The building system of claim 17, wherein the coating is applied to a central region of each the first and second building panels, and wherein a surface of the central region of the first building panel is parallel with a surface of the central region of the second building panel.

19. The building system of claim 17, wherein the binder has a pH of at least about 7.0 and a Tg of at least 20° C.

20. A building system comprising:
a plurality of building panels having at least a first building panel and a second building panel;
a coating over the first building panel and the second building panel; and
a seam-filling material between the first building panel and the second building panel;
the coating comprising:
a binder;
a pigment blend comprising titanium dioxide, calcium carbonate, and diatomaceous earth; and
a viscosity modifier;
wherein the viscosity modifier comprises a humectant and a dispersant;
wherein the humectant and the dispersant are present in a weight ratio ranging from about 1:1 to about 4:1;
wherein the pigment and the binder are present in a weight ratio of at least about 7:1; and
wherein the binder comprises styrene acrylic copolymer or polyvinyl acetate.

* * * * *